United States Patent [19]

Masch

[11] Patent Number: 5,930,762
[45] Date of Patent: Jul. 27, 1999

[54] COMPUTER AIDED RISK MANAGEMENT IN MULTIPLE-PARAMETER PHYSICAL SYSTEMS

[75] Inventor: Vladimir A. Masch, New Providence, N.J.

[73] Assignee: RCO Software Limited, St. Peter Port, United Kingdom

[21] Appl. No.: 08/717,821

[22] Filed: Sep. 24, 1996

[51] Int. Cl.$^6$ ........................... G06F 17/60; G06F 17/10; G06F 17/16

[52] U.S. Cl. .................................... 705/7; 705/8

[58] Field of Search ........................................... 705/7, 8

[56] References Cited

U.S. PATENT DOCUMENTS

| | | | |
|---|---|---|---|
| 4,744,026 | 5/1988 | Vanderbei | 364/402 |
| 4,744,027 | 5/1988 | Bayer et al. | 364/402 |
| 4,744,028 | 5/1988 | Karmarker | 364/402 |
| 4,953,085 | 8/1990 | Atkins | 364/408 |
| 5,051,745 | 9/1991 | Katz | 341/51 |
| 5,148,365 | 9/1992 | Dembo | 364/402 |

OTHER PUBLICATIONS

"Economy's Strength is Seen Cooling in Second Half," The Wall Street Journal, Jul. 1, 1996, p. 2A.
"Heads I Win, Tails You Lose," The Wall Street Journal, Aug. 6, 1996, p. A15.
"A dose of patent medicine," The Economist, Feb. 10, 1996, pp. 71–72.
"At the Crest of the Tidal Wave" by Robert R. Prechter, New Classics Library, 1995, pp. 19–20.
"Robust Optimization of Large–Scale Systems" by J. M. Mulvey, R. J. Vanderbei and S. A. Zenios, Operations Research, v. 43 (1995), No. 2, pp. 264–281.

(List continued on next page.)

*Primary Examiner*—Emanuel Todd Voeltz
*Assistant Examiner*—William N. Hughet
*Attorney, Agent, or Firm*—Irwin Ostroff; Robert B. Ardis

[57] ABSTRACT

A computer method manages risk in multiple-parameter physical systems performing interrelated activities, where at least one of such activities is risk-related in that it may have an outcome level which may fall outside of boundary limits. The method establishes a course of action (strategy) for the physical systems that facilitates preventing any outcome levels for risk-related activities from falling outside of boundary limits. The method assumes the existence of a computational multiscenario decision-making model that describes the physical systems and determines, under some set of criteria, both feasible and desirable levels of their activities. The method may assume either certainty, under which the value of each model parameter is known, or uncertainty, under which the values of one or more of model parameters are unknown. The method finds a set of satisfiable boundary limits in computer memory, develops in computer memory a multitude of candidate strategies that satisfy these limits, describes the strategies in computer memory in formats of multidimensional outcome and regret matrices, and jointly applies to such matrices multiple optimization criteria: first, to exclude inferior strategies and, second, to aid decision-makers in selecting a good and risk-protected implementable strategy.

11 Claims, 14 Drawing Sheets

OTHER PUBLICATIONS

"Decision Making under Risk and Uncertainty: New Models and Empirical Findings" ed. by John Geweke, Kluwer Academic Publishers, Dordrecht, the Netherlands, 1992, pp. 1–16.

"Scenario Optimization" by Ron S. Dembo, Annals of Operations Research, v. 30 (1991), pp. 63–80.

"Economic Risk Decisions in Engineering and Management" by J. R. Buck, Iowa State University Press, 1989, pp. 313–334.

"Decision Analysis" by Howard Raiffa, Addison Wesley, 1970, p. 274.

"Principles of Operations Research" by Harvey M. Wagner, Prentice–Hall, Inc., Englewood Cliffs, NJ 1969, pp. 657–668 and 678–684.

"Games and Decisions" by R. Duncan Luce and Howard Raiffa, John Wiley & Sons, 1957, pp. 274–303 and 324–326.

"On the Accuracy of Economic Observations" by Oscar Morgenstern Princeton University Press, 1950, pp. 33–45 and pp. 94–96.

Manual entitled "Robust Optimization—MIMI/R Operations Guide" by Vladimir A. Masch, New Providence, NJ, 1990.

Promotional Pamphlet entitled "Robust Optimization in Planning and Risk Management" by Vladimir A. Masch, New Providence, NJ, 1991.

Promotional Pamphlet entitled "Risk Management with Robust Optimization" by Vladimir A. Masch and Thomas E. Baker, New providence, 1991.

Charles A. Weber, "Supplier Selection Using Multi–Objective Programming: A Decision Support System Approach", International Journal of Physical Distribution & Logistics Management, v 23, n 2, pp. 3–14. 1993.

FIG. 7

PAYOFF MATRIX

| SCENARIO | STRATEGY | | | | BEST SCENARIO COST |
|---|---|---|---|---|---|
| | A | B | C | D | |
| 0 | 89,472 | 91,063 | 96,013 | 101,512 | 89,472 |
| 1 | 200,099 | 91,063 | 96,013 | 101,512 | 91,063 |
| 2 | 132,422 | 135,339 | 130,599 | 125,331 | 125,331 |
| 3 | 100,341 | 101,801 | 106,751 | 112,250 | 100,341 |
| 4 | 244,375 | 135,339 | 130,599 | 125,331 | 125,331 |
| 5 | 157,298 | 101,801 | 106,751 | 112,250 | 101,801 |
| BEST COST | 89,472 | 91,063 | 96,013 | 101,512 | |
| WORST COST | 244,375 | 135,339 | 130,599 | 125,331 | |
| EXPECTED COST | 139,239 | 103,139 | 106,151 | 109,498 | |
| EXPECTED IR COST | 154,001 | 109,401 | 111,121 | 113,031 | |

FIG. 8

REGRET MATRIX

| SCENARIO | STRATEGY | | | |
|---|---|---|---|---|
| | A | B | C | D |
| 0 | 0 | 1,591 | 6,541 | 12,040 |
| 1 | 109,036 | 0 | 4,950 | 10,449 |
| 2 | 7,091 | 10,008 | 5,268 | 0 |
| 3 | 0 | 1,460 | 6,410 | 11,909 |
| 4 | 119,044 | 10,008 | 5,268 | 0 |
| 5 | 55,497 | 0 | 4,950 | 10,449 |
| | | | | |
| BEST REGRET | 0 | 0 | 4,950 | 0 |
| WORST REGRET | 119,044 | 10,008 | 6,541 | 12,040 |
| EXPECTED REGRET | 38,841 | 2,742 | 5,754 | 9,099 |
| EXPECTED IR REGRET | 96,889 | 3,844 | 5,564 | 7,474 |

COMPUTER AIDED RISK MANAGEMENT IN MULTIPLE-PARAMETER PHYSICAL SYSTEMS

FIELD OF THE INVENTION

This invention relates to computer aided management of risk in multiple-parameter physical systems having one or more risk-related activities and more particularly, although in its broader aspects not exclusively, to computer aided management of risks arising from decisions made under conditions of uncertainty.

BACKGROUND OF THE INVENTION

A need for risk management decisions arises in a broad range of technological, industrial, and financial areas. Typical examples include operation of manufacturing, storage, and transportation facilities in an industrial logistics system, control of product mix at a factory, deployment of industrial equipment, electrical engineering and mechanical engineering problems, inventory control, advertising campaign management in a marketing program, and management of a portfolio of financial assets, to name just a few.

As an example, consider the problem of efficient lighting in a commercial facility. The facility owner has to provide the required lighting conditions in the building. He would like to install state-of-the-art lighting systems and controls in order to curb energy consumption at this facility. The state-of-the-art equipment commands a premium price, mitigated however by rebate incentives from the local utility company. At the same time, the owner would like to minimize the cost of the lighting devices that are necessary to provide the required lighting conditions.

In this example, the owner calculates the operating costs of lighting the facility with different types of devices, based upon data provided by the manufacturers. These data usually correspond to power factor at the facility being equal to 1.0. Real world conditions introduce a variability of power distribution to that facility that reduces the power factor and affects the operation of the selected equipment and, therefore, its operating costs. Such conditions induce a consideration of auxiliary devices that restore the power factor at the facility to unity.

The risk management decision in the facility owner's problem is to find a combination of the quantity and quality of lighting devices, controls, and auxiliary devices that minimizes the payback period but still affords protection from the twofold risks of both exceeding the planned operating costs and underachieving the desired lighting conditions. The decision should contain these risks within some acceptable limits.

To demonstrate the universality of the need for risk management decisions, consider next a problem of efficient distribution of products by an industrial manufacturing company. The distribution system starts with the company factories that manufacture the products and ends with buyers (such as wholesalers) who order the products. The system includes a network of distribution centers and warehouses, as well as transportation facilities to move the products. All of these may belong to the company, or may simply be used by it. All facilities of the system (namely, the factories, the distribution centers, the warehouses, and the transportation vehicles) are characterized by their production, throughput, or storage capacities. Similarly, use of all these facilities invokes their associated costs. If the distribution system is not limited to a single country, costs and prices may need to be expressed in different currencies. Manufacturing, transportation, loading and unloading, and handling the products at warehouses—all of these procedures require resources and time.

Demand depends on product prices which, in turn, may be related to cumulative product costs at the buyers' locations. It also depends on the behavior of competitors, which is determined partly by the company's own pricing and other policies, and partly on other factors, largely unknown.

Any inability to meet the buyers' demand, and to do it on time, involves explicit or implicit economic penalties. Similarly, penalties arise if the company procures work force, equipment, and materials to meet its planned production targets, and then has to change its plans, causing mismatches.

The values of all parameters of the distribution system, including its technologies, the needed production and transportation time, the required resources and capacities, demand, prices and costs, currency conversion rates, and penalties (especially implicit penalties), are not known exactly. They may also change over time. The values for these parameters can only be estimated or forecast. The risk management part of the efficient distribution problem is to find a combination of technologies, production targets, inventory levels, and transportation flow at all stages of the distribution system during the planning period, as well as of product selling prices and levels of demand to be satisfied, so that no production, warehousing, or transportation capacity constraints are exceeded and total profits are maximized, while the risks of insufficient profits or losses, penalties, foreign exchange rate changes, or unmet demand and broken schedules are kept within acceptable limits.

Finally, let us consider a financial portfolio management problem. For simplicity, assume that the portfolio may include only fixed income securities of different maturities but of one general type, such as bonds issued by the United States Treasury. The portfolio does not include corporate and municipal bonds, stocks, financial instruments in currencies other than U.S. dollars, mortgage-based securities, or derivative financial instruments, such as options.

In this last example, the portfolio manager has exact data about the composition of his portfolio, that is, about the face value of portfolio bonds, by issues. The manager also knows all characteristics of each existing Treasury bond issue, both present and not present in the current portfolio. These characteristics include the issue's date of maturity, coupon or discount rate, the schedule of coupon payments, the coupon interest that has accrued on the issue from the time of the last coupon payment, the transaction costs on acquiring or selling the bond, callability, and the availability of the issue for purchase.

In this example, the manager also knows the latest bond market quotes on bid and ask prices for all existing Treasury issues, although these quotes may differ from the real execution prices of bond trading. This difference may exist even if the bond is traded (purchased or sold) at this very moment, especially for bonds not actively traded in the market. However, both the bid and ask quotes and the execution prices for each bond issue depend upon the supply/demand relationship for that issue, which changes all the time. Therefore, if a bond is purchased or sold not immediately but later, this relationship may change drastically, entailing the corresponding price changes. For any time in the future, the portfolio manager does not know in what direction and how much prices will change for any issue. Moreover, changing bond prices affect not only new trades: the worth of the whole portfolio is regularly re-evaluated (marked-to-market) at current prices.

In this example, the portfolio manager wants to maximize portfolio returns. However, he also has to carry out certain obligations to the portfolio owners (investors). Perhaps the most important obligation is to make scheduled payments to investors—either some contractually specified amounts, amounts that stand for the returns on investment and repayment of the investment principal, or amounts that symbolically represent advances on the investment returns that are expected in the future.

Besides these payments, the portfolio will have in the future some other cash inflows and outflows. The inflows are mostly new investments in the portfolio, coupon payments from the Treasury on the portfolio bonds, and the principals of the portfolio bonds that have matured. The main outflows are the withdrawals by the investors from the portfolio and the administrative costs of portfolio management. While the coupon payments fully depend on the composition of the portfolio and the management costs can be anticipated with sufficient accuracy, both the new portfolio investments and portfolio withdrawals can at best be "educated guesses."

The portfolio can trade bonds, i.e., sell the bonds currently in the portfolio and, using these funds together with new inflows, purchase some other bonds.

The permitted portfolio trading activities are restricted by a number of laws, rules and constraints of fiduciary, regulatory, tax, and other origin. There may be constraints on borrowing, margin trading and other leveraging of the portfolio funds, short sales, and so on. One of the main constraints is a fiduciary requirement that commonly obliges the manager to preserve the principal capital of the portfolio, that is, to protect the portfolio against unacceptable risks.

The portfolio manager can base his portfolio decisions either solely on the latest bond market quotes which he knows, or on a combination of these quotes and future bond prices that can be expected for some moment of time yet to come.

The risk management problem of the portfolio manager is to find a planned combination of bond trades so that all constraints on the portfolio activities are met and the portfolio returns are maximized, while the portfolio funds are protected against losses that would exceed the acceptable risk limits.

These three examples demonstrate the extreme complexity of making risk management decisions. Still, these are relatively simple situations—real life decision-making in financial and industrial business organizations can be much more complicated. For instance, the financial portfolio in the last example could include not only Treasury bonds, but also corporate and municipal bonds, stocks, futures, options, financial instruments in other currencies, and other types of securities.

It should be noted that the risk management problems discussed above are real physical problems arising in real physical systems. (A portfolio of fixed income securities is also a physical system—a set of physical bonds.) While it is true that this invention represents significant quantitative aspects of these physical problems by mathematical models, the purpose of these models is to make decisions about target values which are then used in the physical world to construct or operate physical systems. Typical prior art examples of such mathematical models for making decisions about physical systems are the use of linear programming (LP) for efficient resource allocation or for optimizing system operational parameters, the use of scenario optimization for the management of a portfolio of financial options, and the use of mathematical equations to construct radio antennas or to control rubber-molding operations.

Moreover, the mathematical models used in this invention are, as a rule, too complicated for application in reasonable time without a computer. Therefore, their use involves changing the physical condition of the computer memory, thus virtually creating a new state of the computer.

To exercise risk management, it is first necessary to define "risk."

Every decision in any of the areas listed above, such as electrical engineering, industrial logistics, and portfolio management, involves, on the one hand, a specific allocation of resources and, on the other hand, specific outcomes from different activities of the physical system. These results may be as diverse as costs or profits, returns on financial portfolios, quality of products, the composition of product mix, consumption of electricity, penalties for broken schedules or unsatisfied demand, or the amount and chemical composition of waste water. The values of some of these results are of special concern to decision-makers (DMs), who consider such results undesirable or even potentially dangerous and want them either to stay within some boundary limits (which may or may not be known in advance), or to be as low or as high as possible. The systems activities that are subject to special concern will be called "risk-related activities."

Outcomes in risk-related activities depend both on the targets to be achieved and on the allocation of resources within the physical system. In general, it is this dependency that is described by a mathematical model. As a rule, the parameter values of the dependency relationship in the system, or of the mathematical model, are not known with certainty and can, at best, be estimated or forecast, and often just guessed. Even if they are forecast, it is still hardly ever, if at all, possible to obtain a reliable forecast, especially for the long term. The consequences of a decision about the allocation of resources in a physical system are, therefore, uncertain and involve the possibility of unexpected and, possibly, undesirable or even dangerous outcomes.

"Risk" is defined here as a magnitude of outcome levels of undesirable or potentially dangerous activities that have fallen outside the relevant boundary limits. Risk management, then, is the capability to estimate, to avoid, to control or to reduce the extent of such occasions and reduce the probability of their occurrence. "Risk" can be defined in many ways, both absolute and relative, and this invention can be applied in the framework of any of these definitions. The exact definition of risk is here irrelevant, so, for simplicity, only one definition is used.

To understand the need for the present invention, consider the current state-of-the-art both in the general is area of decision-making and, specifically, in risk management.

Roughly, from the time the computer era began—that is, in the late 1940s and early 1950s—great advances were made in two fields important to decision-making: Operations Research/Management Science (OR/MS) and Decision Science (DS). OR/MS primarily deals with optimization models, while DS analyzes alternative strategies under uncertainty and selects one candidate strategy over all others.

A rational, natural and customary way to make a decision is to recognize the uncertainty of the future and the lack of knowledge about the present, to represent the uncertainty and lack of knowledge through scenarios, and to consider the outcomes—possibly in many activities—under each scenario, given a course of action or strategy. Arranging information about these outcomes into an "outcome matrix" is a good technique for systematic analysis of the data. This is the basic approach of classical DS, which starts from an outcome matrix, or, more specifically, often from a "payoff matrix"—a special case where all outcomes are quantified and are of the same type, such as profit.

However, this assumes that scenarios, candidate strategies, and "strategy versus scenario" outcomes are specified beforehand. Thus, classical DS in effect is "passive"—it withdraws itself from tasks that constitute 95 to 99 percent, or even more, of the total effort. Instead of addressing the whole real world problem of making a decision, DS limits itself to the last, and often the easiest, part of the process.

In contrast, OR/MS uses "active" optimization models. These models address the main part of the decision-making problem not covered by DS: they formulate a plan or a strategy. Using mathematical equations and inequalities, the models define a region of feasible solutions (i.e., solutions that do not violate those equations and inequalities) and find in that region a solution that is "the best" from the point of view of one or more criteria of optimality.

The most widely used optimization model is an LP model. It is also the basis for and a major component of all other more sophisticated mathematical programming models, such as integer or non-linear programming models. It defines a set of interrelated activities and a set of constraints on the level of each activity, as well as on the levels of some specified linear functions of these activities. The LP model also defines the "objective function" as the total sum of the net benefits (benefits minus expenses) of activities, which also is a linear function of activity levels. The solution of an LP model is based on a single criterion: finding the allocation of resources to maximize the value of the objective function. One method of solving an LP model is described by U.S. Pat. No. 4,744,026 to Robert J. Vanderbei, U.S. Pat. No. 4,744,027 to David A. Bayer et al., and U.S. Pat. No. 4,744,028 to Narendra K. Karmarkar, all issued May 10, 1988.

When applied correctly, LP models have many valuable advantages. The models can integrate, connect, coordinate, balance, and jointly analyze different factors, operations, and territorial or functional parts of a physical system. They can find hidden opportunities for improvement and are easy to set up, although this simplicity can sometimes be very deceptive. They can also derive plans from the initial data, without the need of losing time and effort on intermediate analyses, and thus increase the speed of decision-making.

LP models became invaluable tools for dealing with "closed" decision-making problems, problems that exclude any significant deviations from the status quo in important decisions. In the petroleum industry, which began to apply LP in the late 1940s, mathematical programming concepts penetrated all facets of short-term business planning, from supply, distribution and refinery planning to product blending and process control. Scheduling of Air Force planes was a triumphal application of sophisticated, large-scale integer LP models during the 1991 Gulf War.

Conventional optimization techniques have never been successful, however, in dealing with "open" problems that predominate in long-term and strategic planning. This is because prudence and moderation, the two crucial components of mature decision-making and risk management, are not among the advantages of optimization models. LP models seek extremes and are stopped only by such model constraints as equations or inequalities. Even a minuscule alteration of input data, well within the margin of possible error, may cause a change of solution. Moreover, the solution always switches from one extreme to another, so that the resulting change can be disproportionately large. Therefore, solutions of LP models are inherently unstable; they introduce an additional risk component of their own.

Instability of solutions causes three major difficulties in applying such models. The first such difficulty comes from uncertainty. A model may provide valid results only if the model data are sufficiently accurate (which means the modeler must have adequate knowledge of both the present and the future), or if the major decisions in the optimal solution remain sufficiently stable as data varies regarding the possible actions and their consequences. Second, LP models have a simplistic, well defined, one-dimensional goal, while the DMs' goals usually are more diverse, conflicting, and ambiguous. Third, by definition, the models are incomplete and they may omit important factors, considerations, and constraints, such as long-term considerations in a short-term model.

In other words, LP models fully confirm an observation of Oscar Morgenstern ("On the Accuracy of Economic Observations," Princeton University Press, 1950, p. 45) that ". . . every type of numerical observation, based upon a mathematically formulated model, imposes restrictions upon the data. If these restrictions cannot be met, the operations become impossible, even if the underlying model should be free from objections."

Remedies have been proposed to deal with some of these drawbacks. For example, stochastic programming (SP), an important mathematical programming extension of LP, is intended to deal with uncertainty. To a certain degree, SP performs this function, but it offers only an implicit and limited protection against risk attendant to uncertainty. Its risk protection is valid only in a statistical sense: if its optimal solution is repeatedly implemented a very large number of times, it will eventually prove the best. However, with a few exceptions, the decision-making situations are either unique and non-repetitive or are repeated only a small number of times. If a harmful or adverse situation happens during one of those times, the losses resulting from the "optimal" decision may never be recouped.

Also important, SP does not offer choices to the decision-makers: it constructs a single solution and declares it to be the optimum. SP therefore deprives them of enormous advantages coming from the use of outcome and regret matrices and DS criteria.

However, the crucial point is that SP usually is simply inappropriate as a basis for making complex decisions in the relevant fields. In "Risk, Uncertainty and Profit," by F. H. Knight, University of Chicago Press, 1921, a clear distinction is made between "insurable risk" and "non-insurable uncertainty." In that approach, insurable risk is said to exist when the probabilities of outcomes are known exactly and are derived on an objective basis; that is, they are calculable on the basis of relative frequencies or similar data. Non-insurable uncertainty exists in the absence of objective and known probabilities.

At the same time, probabilities are considered to be calculable and adequate only for "repetitive phenomena of a standardized variety such as occur in games of chance, in actuarial science, in genetics, and in statistical mechanics." ("Decision Analysis—Introductory Lectures on Choice under Uncertainty" by Howard Raiffa, Addison Wesley, 1970, p. 274). In contrast, the decision-making problems to be addressed by SP deal with complex economic, financial, technical and social phenomena, which, as indicated above, are non-repetitive. At best, the probabilities related to these phenomena include subjective judgments and more or less educated guesses. In these problems, probabilities are the least reliable part of the input data.

Recognizing this need in probabilities of future events, a leading practitioner of SP states, for instance, in the U.S. Pat. No. 5,148,365 to Ron S. Dembo, issued Sep. 15, 1992, that "For those of skill in the art of portfolio management, the probability of the various scenarios can be guesstimated with reasonable accuracy based on experience" (column 8, lines 56–59). Notably, the author does not even mention objective probabilities which, as indicated above, are the precondition for proper applications of SP. He would be quite satisfied with the "guesstimated" probabilities, subjectively assumed by the portfolio managers.

However, even these lowered data demands cannot be met. Those "of skill in the art of portfolio management" disagree with the author's high evaluation of their capabilities and consider it to be little but wishful thinking. A leading financial forecaster writes: "To be sure, most forecasters' expectations do not work out at all. For instance, in June 1990, 88% of economists predicted continued economic expansion for at least a year. A month later, the worst recession in a decade began. As merely the latest example, a June 1994 survey of 29 of the country's most influential money managers showed that all of them expected the long bond yield to remain below 8% during the rest of last year. It was above 8% three months later. Evidence of the failure of conventional forecasting methods is more than anecdotal. According to *The Wall Street Journal*, a study of its own surveys since 1982 of the country's top economists reveals that in the aggregate, these acknowledged experts predicted accurately the direction (forget the extent) of interest rates only 25% of the time, which is half the success rate that would be produced purely by guessing." (Robert R. Prechter, "At the Crest of the Tidal Wave," New Classics Library, 1995, pp. 19–20). The latest surveys provide similar results. (The Wall Street Journal, Aug. 6, 1996, p. A15).

Moreover, if the applications of SP are controversial even when they involve just the insurable risk, because the "optimal" strategies do not sufficiently protect from risk, then, under uncertainty, when the objective probabilities are not known, this method becomes even more controversial. Therefore the SP procedure has to be based on a combination of two implicit premises. The first assumes that there exists an objective optimum under uncertainty, that it can be found by objective methods, and that it is just a matter of technique to find that optimum—namely, a matter of applying the correct model and getting correct data. The first premise also assumes that these techniques have been sufficiently attained in modeling and solving the problem under consideration. The second premise concedes that the optimum may indeed be subject to qualifications, such as the personal risk attitude and subjective preferences of the decision-maker, but assumes that these still can be incorporated into the SP model on the basis, say, of prior observations of the DMs' behavior and attitude, and that, again, these requirements are met in the problem under consideration.

The first assumption has been proven wrong. Both the authoritative "Games and Decisions" by R. Duncan Luce and Howard Raiffa, John Wiley & Sons, 1957, pp. 274–303 and 324–326, and later literature, such as "Decision Making under Risk and Uncertainty: New Models and Empirical Findings" ed. by John Geweke, Kluwer Academic Publishers, Dordrecht, the Netherlands, 1992, pp. 1–10, show that, even in the simplest case of a two-dimensional payoff matrix and a single decision outcome to be considered, such as profit, there are several DS criteria for decision-making under uncertainty—that is, methods for comparing and selecting strategies. (For instance, DMs can base their choice on the average profit, the best case profit, the worst case profit, and some combination of the above.) None of the known or even conceivable criteria of DS is perfect or "the best." Each has faults, such as violations of transitivity, that are revealed under some specific conditions. Thus, even in the simplest case, it is impossible to make the best decision under uncertainty in a general, unique, objective, and theoretically correct manner.

The second assumption is unrealistic, at least in the foreseeable future. As shown, for example, in the above cited "Decision Making under Risk and Uncertainty: New Models and Empirical Findings" pp. 11–16, the existing theories of personal choice under uncertainty, such as the expected utility theory, are still evolving. They cannot yet deal successfully even with some quite simple but paradoxical decision-making situations. If and when this process successfully ends and some comprehensive and consistent decision theory, both normative and descriptive, becomes a reality, its "attitude extracting" procedures still are likely to be lengthy, cumbersome, imprecise, and impractical, not suitable for real life decision-making, especially in complex business situations that require reasonably quick decisions. (The expected utility theory lays claims only to normative correctness but not to a good descriptive characterization of choice under risk and uncertainty. Therefore, it is doubtful that the theory can provide a satisfactory "attitude extracting.")

The "robust optimization" (RO) approach described, for instance, in "Robust Optimization of Large-Scale Systems" by J. M. Mulvey, R. J Vanderbei and S. A. Zenios, Operations Research, v. 43 (1995), No. 2, pp. 264–281, is an extension of SP and has some advantages over SP: it allows solutions that are relatively stable (that is, the optimal solutions under different scenarios remain closer to each other than under SP). Also, RO is multicriterial and allows tradeoffs between several criteria of optimality. However, similarly to SP, RO still relies on scenario probabilities being objectively known. (In the quoted article, the authors circumvent this crucial issue by simply mentioning, in passing, on p. 265 "the probability of the scenario." They do not explain how they succeeded in obtaining these probabilities and whether these are objective or not.) Moreover, even if these unrealistic expectations are met, RO would again offer only long run, "statistical" protection from risk, while its short-term results may be disastrous. Although, by changing the weights of different criteria, RO can form several strategies, it neither constructs payoff or outcome matrices nor applies them for comparison and selection of the best strategy. Also, RO does not use clustering and therefore has to solve models with enormous numbers of scenarios. Finally, too much importance is attached to meeting the initial constraints of the model (see later).

All above considerations about OR/MS and its tools refer to the first part of the decision-making process, namely, to the formation of candidate strategies. As for the second part (selection of a strategy), this is the province of DS. It was indicated above that there are several DS criteria for decision-making under uncertainty. Most of them are based on the "strategy versus scenario" payoff values for a strategy—either on individual values, such as the best payoff and the worst payoff of a strategy, or on values derived from individual payoffs, such as the average payoff. Three best, most comprehensive and sophisticated criteria of payoff type are the optimism-pessimism index (OP) criterion, the partial ignorance (PI) criterion, and the modified insufficient reason (IR) criterion. These three criteria, which are previously known, provide the basis for new methods of this invention.

All three are "synthetic" criteria, which means that they are quite general and include as special cases other, simpler criteria. For instance, both minimax and maximin payoffs are special cases of all three criteria, the expected payoff is a special case of the PI criterion, etc. The synthetic criteria perform an extremely important role: they minimize the negative impact of absence or lack of knowledge about probabilities of future events and their combinations (scenarios).

As mentioned before, probabilities are the least reliable part of input data, and decision analysis under risk and uncertainty cannot therefore generally dispense with subjective judgments, including judgments on probabilities. The goal is to minimize both the impact of these judgments and the effort required to form them. It is especially important to arrange the introduction and use of probabilities and other judgments in a manner least detrimental to successful decision-making, which means to postpone their use until the latest possible stage of analysis.

Fortunately, probabilities do not have to be used at the initial stages of the analysis, as is done in SP, decision tree methods, and so on. They also can be compressed into a very few parameters that estimate the overall degree of uncertainty. Furthermore, data requirements can be made less stringent by allowing the values of these parameters to fall within broad intervals, rather than correspond to a single value. Synthetic criteria meet all these requirements.

All new methods are also synthetic and therefore have the same advantages. However, these methods additionally combine OP, PI and IR with the concept of "regret" introduced into Decision Science by Savage in "The theory of statistical decision," *Journal of the American Statistical Association*, 46 (1951), pp. 55–67. Regret is basically a cost of uncertainty; it is derived from the payoff matrix and characterizes the risk, or regret, or opportunity lost because of choosing a wrong strategy. Regret may also be defined as the potential for reducing risk by switching strategies. See calculation of regret by Eq. (7). In some special connotations, but not in this invention, "regret" is defined as the difference between a given benchmark, such as the performance of the stock market, and the actual or projected results. In previous state-of-the-art Decision Science methods, regret has been used only in simple non-synthetic criteria, such as average regret or minimax regret (see, for instance, J. R. Buck, "Economic Risk Decisions in Engineering and Management," Iowa State University Press, 1989, pp. 313–334). To the best of my knowledge, the comprehensive OP, PI and IR criteria have not been applied to regret; it is done for the first time in this invention.

In addition, the new regret-based synthetic methods naturally give rise to decision formulas and graphs that use and expand the concept of "efficient frontier" (see later). The proposed new methods are invaluable for finding desirable limits on tightening the discretionary constraints.

A crucial difficulty in applying DS is that none of strategy selection criteria is "the best" under all circumstances. This opens the way to combining criteria—another method of this invention.

The need to deal jointly with the totality of complicated decision-making issues such as uncertainty, the multiple criteria involved in real world decision-making, and the incompleteness of mathematical models, creates additional difficulties. Especially crucial is incompleteness: it cannot be eliminated in principle, since the only complete model of a reality is the reality itself.

This analysis shows that both general approaches to decision-making (OR/MS and DS) have serious flaws if used as mutually exclusive tools, as is the current practice. Let us see how these general considerations are reflected in the specific field of risk management.

Both the theory and practice of risk management are most advanced in the financial industry, therefore we begin our survey there, although the issues and techniques that are specific to managing portfolio risks are not directly addressed in this patent application.

Modern Portfolio Theory constructs the efficient frontier—the risk/return curve, which defines a portfolio with the highest expected return for a given level of risk, or the lowest level of risk for a given level of expected return. In other words, it attempts to "optimize" a portfolio, to find the best tradeoff between expected return and expected risk. What is "the best" is determined by the subjective risk attitude of the decision-maker. However, in practice this approach is "passive": it does not form portfolios but ranks only "external" portfolios that are developed outside the system. Moreover, the weakest link of this approach is its inability to evaluate and manage risk sufficiently well. Depending on market conditions, the forecast levels of risk may prove to be good or bad approximations of reality.

Until the early 1980s, risk management in financial institutions was mainly limited to the use of Asset/Liability Models (ALM). That methodology estimates future earnings under a number of probable scenarios of economic and financial conditions, projects future cash flows for one or more candidate investment strategies, derives final assets and liabilities resulting from each strategy under each scenario, and presents the estimated returns for all "strategy versus scenario" combinations in the format of a payoff matrix. ALM thus follows the approach of DS, but its implementation has serious flaws.

ALM was primarily intended for such institutions as commercial banks, where both assets and liabilities were relatively illiquid and were priced on an accrual basis. ALM is based, however, upon a false assumption that gains or losses occur when they accrue. To find out returns, ALM needs simulation over long periods, until most portfolio transactions mature. Trading items, which must be marked-to-market, are treated separately, and it is difficult to arrange hedging between trading and accrual items. For that purpose, "proxy values" (that is, approximations to market values) have to be estimated for accrual items. ALM also has other faults. Again, one of these is that ALM is passive—it provides no means for devising a good investment strategy and evaluates only "external" candidate portfolios. A second fault is that ALM is not capable of dealing with a large number of scenarios that might be needed because long-term scenarios are not accurate. The accumulation of all these faults is worrisome.

Unfortunately, during the past two decades several trends have evolved that made risk management in finance both more difficult and more necessary. Some of the most important of these trends are:

(a) Securitization of financial instruments, increase of their liquidity, wide use of more volatile instruments, such as derivatives and especially options, and moving from accrual accounting to frequent revaluation and marking-to-market of positions;

(b) Increased volatility of financial markets, which is due to their globalization, advances in information technology, and growth of mutual funds, especially those specializing in emerging markets;

(c) Increased trading, and especially the institutional trading for an institution's own account; and (d) Emphasis on performance, which as a rule can be improved only by assuming higher risks, that sometimes lead to rogue trading, fraud, and eventual financial disasters.

These trends cause concern about risk control among both the institutional managers and regulators. Two risk evaluation methodologies have been developed to meet these concerns. Value-at-Risk (VAR) considers risk that arises from random market movements, while Stress Testing deals with risk of the worst-case scenarios. Both methods have their advantages and disadvantages, and they are best applicable under different circumstances.

The VAR method assumes that rate and price movements of financial instruments can be described in a statistical fashion. If VAR is applied at times when this assumption is correct and the markets are statistically stable, the method provides an estimate of the loss that is expected to occur no more than, say, 5 percent of the time.

However, VAR depends heavily on estimates of volatilities and correlations that are derived either from historical data or from the values "implied" in current market prices. The trouble is that when a market collapses or makes a sharp move, that is, when we really need the risk control method to work, all these estimates become irrelevant, because actual volatilities greatly exceed the estimated values—by at least several multiples.

The Stress Testing method uses defined scenarios, including those for unstable markets. The scenarios can be simulated on the basis of both market conditions for selected periods in the past and "educated guesses." This method provides more information of the expected portfolio performance, but it is computationally demanding even for a sharply restricted number of scenarios.

These two methods can be used in combination, benefiting from the advantages of each. Their joint use does not overcome, however, their common fault: both methods are "passive" in that they do not necessarily generate good portfolios but rather only evaluate portfolios constructed elsewhere. Both methods, and especially their combination, can be used as a prelude to "optimizing" portfolios, as defined above.

There are attempts to provide a combination of portfolio optimization with risk management by SP. The trouble with these attempts is that SP protects from risk (and only from "insurable risk") only in a stable market, where historical statistical parameters are valid.

To sum up, no methods used in portfolio management are quite satisfactory or provide good risk management.

Outside the finance industry, both the theory and practice of risk management are much less advanced. A number of large companies follow the approach of scenario planning, which can serve as a foundation to risk management. As currently used, however, this methodology as a rule is wrongly focused on the definition of scenarios, rather than on rigorous development of candidate strategies, and especially compromise strategies.

At the same time, the business world has become more volatile. Uncertainty has become the rule rather than exception, and it too often brings unpleasant surprises. As in finance, this makes risk management both more difficult and more necessary.

A common factor in all current practice is that, when dealing with multiple-parameter physical systems, effective risk management escalates quickly in complexity until it is literally beyond the capacity of the human mind to handle on any basis other than that of an educated guess or a "rule of thumb." The existing computational approaches are also inadequate. Moreover, many of them, such as LP models, increase risk by adding a risk element of their own. There is, therefore, a real and continuing need for tools that will aid in valid risk management.

SUMMARY OF THE INVENTION

This invention deals with decisions about the future activities of physical systems that have potentially dangerous, risk-related activities. "Risk" is defined here as a magnitude of outcome levels of these activities that have fallen outside some boundary limits, which may be either predetermined, or determined in the process of making the decision, or both. This invention provides new techniques in five broad directions.

First, whatever model (used herein in the broad sense of encompassing a formula or a method as well) is used to make the decisions, as a rule it is not always completely reliable for selecting the best decision. Such a model may, however, be used for an easier task—screening out bad and risky decisions. For that purpose, the model has to be complemented by adding explicit risk-limiting constraints based on specific boundary limits. The "risk-limiting constraints" are defined here as either mathematical equations and inequalities that, once added to the model, eliminate or reduce outcomes falling outside the boundary limits, or other means (such as high fines and penalties) that play the same role of limiting the risky outcomes.

Second, the risk-limiting constraints in this invention are of two different types—predetermined constraints and discretionary constraints. Predetermined constraints are based upon generally recognized safety and regulatory considerations, notions about the tolerable level of the enterprise's profitability, and so on. After these constraints are met, this invention introduces discretionary constraints during the computational process of strategy formation—to find, analyze and fine-tune tradeoffs and to construct alternative candidate strategies. As a rule, predetermined constraints refer to the whole model, but discretionary constraints are usually imposed on outcome levels of specific risk-related activities under specific scenarios. While the predetermined constraints may be used in other models, discretionary constraints are unique to this invention.

Third, as a rule, the addition of risk-limiting constraints makes the expanded model more complex and thus necessitates the use of computers in finding the solutions of the expanded models in a reasonable time. State-of-the-art optimization methods currently available for solving these complicated models, when applied without due attention to risk, are insufficient and often counterproductive, because any such method tends to add a substantial risk component of its own. This invention provides new ways of dealing with that complexity in constructing candidate strategies (a "strategy" is a set or a sequence of possible decisions). These new ways include the use of multiple single-scenario optimization models, as well as both single and multiple multiscenario models.

Fourth, the special structure of the multiscenario models, combined with the use of a relatively small number of strategic variables and with the understanding that a good solution must be good for worst scenarios, leads to the development through this invention of a novel, highly efficient and quickly converging decomposition method for solving large mathematical programming models.

Fifth, decision-making usually comprises two stages: construction of candidate strategies and selection of one of them, to be implemented in the physical system or systems. This invention provides techniques to deal jointly with the whole decision-making process—not only with the first stage, but also with the second stage. At the second stage, these techniques provide new methods of comparing and selecting strategies. They also deal with group decisions, multicriterion decisions, qualitative attributes, and outcomes in multiple risk-related activities.

Broadly, the invention takes the form of a computer method for managing risk in multiple parameter physical systems performing interrelated activities, where at least one activity is risk-related in that it has outcome levels that may fall outside boundary limits. Such boundary limits may be predetermined. The method specifically helps manage risk by establishing a course of action (strategy) for the physical systems preventing any outcome levels for the risk related activities from falling outside these boundary limits. The method assumes the existence of both boundary limits and a decision-making model that defines, under some set of criteria, the best solution of the model and the desirable levels of the activities of the physical systems in that solution. The initial model may be stored in computer memory either directly in its computational form, or in its symbolic, mathematical form. In the latter instance, the model is converted into a computational model in computer memory by replacing symbols with numbers (i.e., the values of parameters).

In its simplest forms, the invention assumes certainty. That is, the value of each parameter, both of the systems and of the decision-making model that is needed to determine that solution, is known. Boundary limits may be generated outside the model.

From one aspect, the method of the invention comprises the steps of finding a set of satisfiable boundary limits and developing in computer memory a multitude of feasible candidate strategies that satisfy the boundary limits, finding the values of outcomes of the risk-related activities for each feasible candidate strategy under relevant conditions by storing and solving a model of the physical systems in computer memory, identifying candidate strategies from the outcomes of the risk-related activities and recording such outcomes in computer memory, and jointly applying in computer memory multiple optimization criteria to the outcomes of the candidate strategies to aid decision-makers in selecting an implementable strategy.

From another aspect, the method of the invention comprises the steps of finding a set of satisfiable boundary limits and developing in computer memory a multitude of feasible candidate strategies that satisfy the boundary limits by computer methods that use risk-limiting constraints, finding the values of outcomes of the risk-related activities for each feasible candidate strategy under relevant conditions by storing and solving a model of the physical systems in computer memory, identifying the candidate strategies from the outcomes of the risk-related activities and recording such outcomes in computer memory, jointly applying multiple optimization criteria in computer memory to outcomes of all candidate strategies to exclude candidate strategies which are inferior to others under the criteria, and jointly applying multiple optimization criteria in computer memory to outcomes of remaining candidate strategies to aid decision-makers in selecting an implementable strategy.

From yet another aspect, the method of the invention comprises the steps of storing the initial decision-making model in computer memory (the model including the known values for each needed parameter of the physical systems), producing a solution of the initial model in computer memory, deriving from the solution of the initial model the levels of outcomes for risk-related activities, and comparing these levels with boundary limits.

If some preliminary boundary limits are violated, the next step of the invention is to modify the decision-making model so that it explicitly includes risk-limiting constraints that eliminate or minimize these violations. If there exists no "feasible" solution, herein defined as one in which all preliminary boundary limits are simultaneously met, at least some of the boundary limits are changed. After such a change, the expanded initial model with added risk-limiting constraints—based on both earlier solutions of the model and changed boundary limits—is solved again, and its outcomes in risk-related activities are compared anew with the boundary limits. This process continues iteratively until a feasible solution is obtained. After that, a similar procedure is used to obtain a "satisfactory" solution, which meets both predetermined and discretionary constraints.

In distinction from the customary mathematical programming, where initial model constraints are considered "sacred" and have to be fully met, this invention admits the possibility of inaccurate data being used in formation of almost any constraints. (The "predetermined" constraints based on valid rules and regulations may be an exception.) After all, even if a model cannot find a feasible solution, real life as a rule still finds it, showing that the model is wrong. Therefore this invention does not necessarily battle infeasibilities, as done in standard mathematical programming or Robust Optimization, but instead prefers to analyze and change the constraints, whenever appropriate and necessary, to find realistic feasible solutions.

A key feature of the invention is that it aids in risk management under conditions of uncertainty. In such a situation, at least one parameter of a physical system has a plurality of different possible values. From this aspect of the invention, the method aids in risk management under uncertainty through the use of scenarios. A "scenario" is here defined as a respectively different combination of values of all needed systems parameters, with each combination including a variation in the value of some uncertain (i.e., multiple value) parameter. The decision model under uncertainty from the very beginning includes risk-limiting constraints that stem from predetermined boundary limits on risk-related activities.

From this aspect of the invention, the method comprises the steps of storing a decision model of the systems in computer memory, the model including the values for parameters of each physical system and at least one of the parameters having a plurality of possible values because of uncertainty; producing solutions of the model in computer memory for a plurality of scenarios; and deriving from the solutions of the model the outcome levels for the risk-related activities of each of the used scenarios.

If, for some scenarios, there exists no feasible solution in which all boundary limits on risk-related activities are met simultaneously, the set of limits may be changed. After such a change is made, the model is applied again with modified risk-limiting constraints that are based on changed limits.

From yet another important aspect of the invention, the computer method aids in risk management under uncertainty by using scenarios via either single-scenario models or multiscenario models that have scenario submodels. (A single-scenario model may be considered as a special case of a multiscenario model, where it also is a single submodel.) Either way, the method of this invention is to develop candidate strategies—sets of numerical values for outcomes of a relatively small number of key (i.e., strategic) variables that correspond to either the most important or immediate and irrevocable decisions. In both instances, the method also focuses on an "outcome matrix"—a three-dimensional array of outcomes of risk-related activities, systematically arranged in a "scenario versus strategy versus risk-related activity" format. (The number of dimensions may be greater than three.) A "regret matrix" derived from the "outcome matrix" plays a no less important role.

The compressed, highly aggregated results accumulated in the outcome and regret matrices serve two main purposes. First, they allow easy generation of a major category of risk-limiting constraints and therefore help to form and modify the candidate strategies. Second, they permit the strategies to be analyzed and compared.

When single-scenario models are used, the method of the invention generates strategies from a multitude of solutions of single-scenario models. It produces solutions that are both "feasible" (defined as meeting all predetermined boundary limits) and "satisfactory" (as explained before, defined as meeting the "discretionary" limits that are imposed during the computational process of strategy formation). The method then constructs the candidate strategies by classifying the values of strategic variables in each scenario solution into specific segments. Finally, it adapts the strategies to conditions of all scenarios and places the resulting outcomes into the corresponding cells of the outcome matrix.

When multiscenario models are used, the method stores an initial multiscenario model of the systems in computer memory. The initial model includes parameters for each physical system, with at least one parameter being uncertain in having a plurality of different possible values. The multiscenario model comprises interconnected scenario submodels for each scenario, each submodel being filled in computer memory by the values of parameters from the corresponding scenario. The multiscenario model produces a compromise solution that takes into account all scenario submodels, as well as probabilities of scenarios, and includes a solution for each of these submodels. The method derives the outcome levels of the risk-related activities for the respective scenarios from solutions of the submodels.

If the decision-makers are not satisfied with the outcome levels for some risk-related activities under some scenarios, or want to find and explore some tradeoffs, the method of the invention adds "discretionary" risk-limiting constraints to the initial multiscenario model and produces solutions to the expanded model with these risk-limiting constraints that move the solution in the desired direction. This addition of discretionary risk-limiting constraints is equivalent to overriding the original scenario probabilities, which are the least reliable element of input information.

From another aspect of the invention, the discretionary risk-limiting constraints can be added to the initial multiscenario model consecutively, in an iterative manner. The invention thus allows the outcome levels of risk-related activities to be brought within acceptable limits on a step-by-step basis.

From yet another aspect of the invention, if the numbers of either scenarios or candidate strategies are too large and require an excessive computational effort, each of these numbers can be reduced to an acceptable level—either by clustering "individual" scenarios or strategies into "typical" scenarios or strategies, respectively, or by using some other basis for grouping scenarios, such as existing functional or statistical relationships. In distinction from the usual applications of clustering, where errors arising from incorrect composition of clusters are difficult to find and eliminate, this invention, when dealing with doubtful cases of assigning individual scenarios or strategies to groups, can "uncluster" them fully or partially and consider, whenever necessary, either the "individual" entities instead of "typical" ones or reclustered "typical" entities.

From yet another aspect of the invention, the method may also deal with a large number of scenarios and with the difficulty of solving the resulting large-scale optimization models. Instead of finding the solution of one large-scale. multiscenario problem that covers S scenarios, the method in turn solves many smaller multidimensional models of a size that can be easily handled—e.g., S/10 of ten-scenario models. This method of the invention combines the advantages of solving small models with the possibility of finding compromise strategies, well adjusted to combinations of diverse conditions. It also introduces new limiting constraints, which are based on the values of strategic variables in solutions of multiscenario problems formed for groups of worst scenarios. This method is a relatively complex aspect of the invention, but is also particularly effective for dealing with very large and complicated problems.

By changing the composition of scenario groups covered by each multiscenario model and by fine-tuning the discretionary risk-limiting constraints imposed on the models, the invention permits finding good candidate strategies in a mere fraction of the time needed for such computations in existing state-of-the-art methods.

As for methods that deal with selection of the candidate strategy to be implemented in physical systems, another aspect of the invention is to provide three new synthetic regret-based methods.

From yet another aspect of the invention, these methods are presented in an analytical and graphic framework of newly developed "efficient frontier (regret)."

Another aspect of the invention involves simultaneous use of multiple weights, or conversion coefficients, to simplify either the outcome and regret matrices or the process of decision-making. Simplifying the outcome or regret matrix may mean it is converted from three or more dimensions to two dimensions, or that qualitative parameters are converted into quantitative values. Simplifying the process of decision-making may mean that multiple criteria are amalgamated into a single criterion, or that the opinions of different members of the decision-making group are made commensurable. Similarly to other mathematical methods, such simplification is often not reliable. Therefore, as in the stage of constructing the strategy, conversion techniques are primarily used to screen out bad and risky strategies, rather than to select "the best" strategy. Moreover, the invention combines the conversion feature with imposing (at the strategy construction stage) risk-limiting constraints, which stabilize and moderate the decisions.

The invention may be more fully understood from the following detailed description of several specific examples, considered in the light of the accompanying drawings and the appended claims. In flow charts, parenthetical numbers are keyed to similarly numbered mathematical models in the detailed description text.

BRIEF DESCRIPTION OF THE DRAWINGS

FIG. 7 illustrates a two-dimensional payoff matrix for a four-strategy, six scenario problem;

FIG. 8 illustrates a two-dimensional regret matrix for the same four-strategy, six scenario problem;

DETAILED DESCRIPTION

Figure 1:
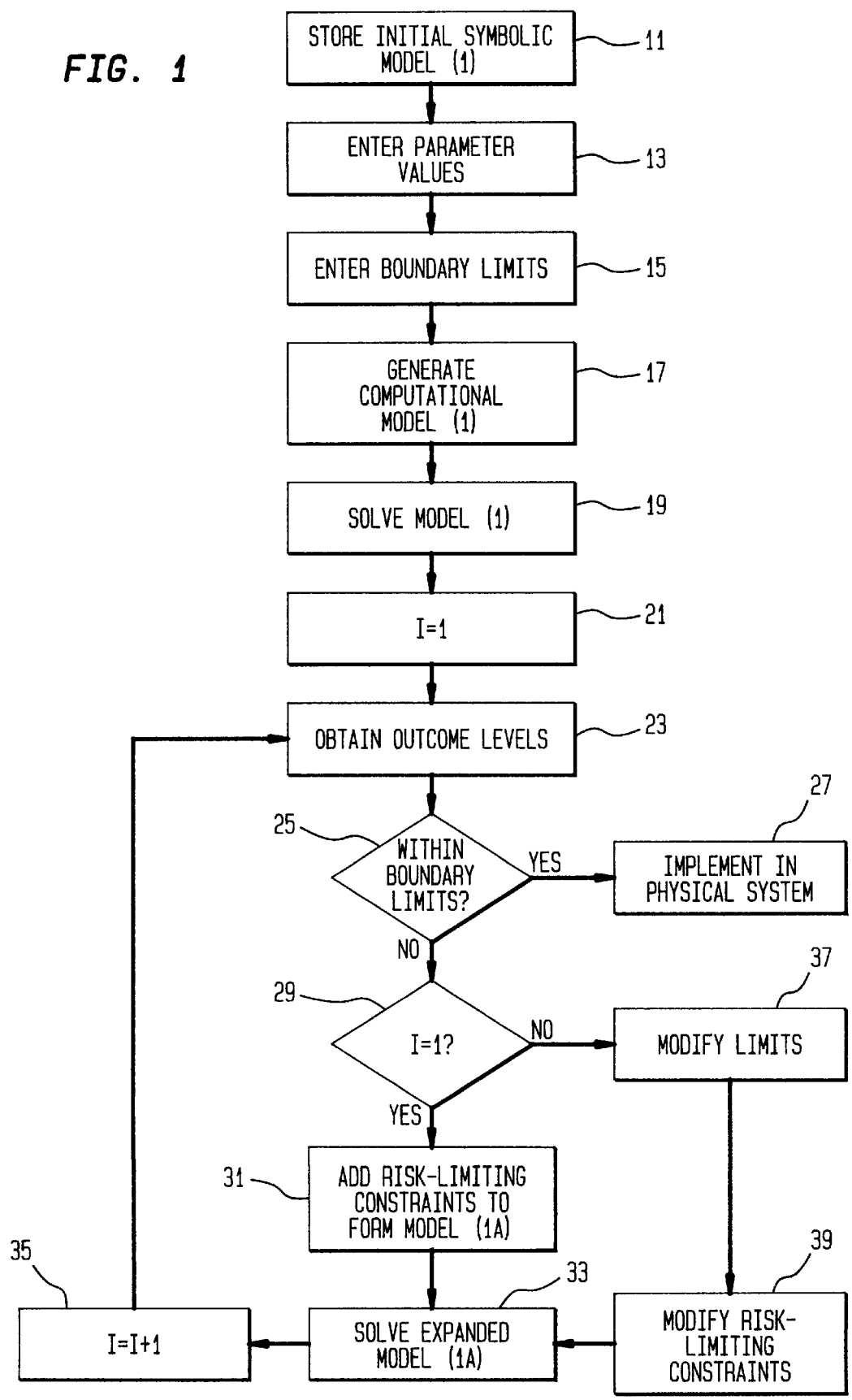
FIG. 1 is a flow chart of a computer method, in accordance with the invention, for managing risk under conditions of certainty.

It is believed useful, at this point, to provide an overall view of the invention before discussing details and the figures.

This invention is a hybrid, an ensemble of two major directions in methods of decision-making, those of OR/MS and those of DS. The two technologies complement each other and are critical to each other's success. The invention uses the improved tools of DS for the selection of the strategy, but it also uses OR/MS optimization models for formation of candidate strategies and for filling in the outcome matrix. Moreover, the optimization models are used in such a way that, instead if increasing risk, they reduce it. Realizing that mathematical models are never completely reliable in real world decision-making, and that optimization models are especially vulnerable because of their introduction of an additional risk component of their own, the invention uses optimization primarily to screen out bad and risky strategies, rather than to construct and select "the best" strategy. This simple but powerful technique helps to deal successfully with very complicated, previously unsolvable problems. But this approach also turns out to be the essence, indeed, the very goal of risk management.

This invention uses techniques of prior art in OR/MS and DS, but uses them in different framework and for different purposes.

First, the primary tool of this invention is the explicit addition to the main model (or a formula or a method) of multiple risk-limiting constraints. Most of the explicit additional constraints are of a "cutting plane" type, well-known in the prior art. These constraints were first introduced into mathematical programming by Ralph E. Gomory in "Outline of an algorithm for integer solutions to linear programs," Bulletin of the American Mathematical Society, v. 64 (1958), pp. 275–278. Up to the present, cutting hyperplane constraints have been used to cut off non-integer portions of the region of feasible solutions and some other similar purposes, but in this invention similar constraints instead cut off portions of the feasible solution region that are too risky, where the unacceptable outcomes are located, leaving for further optimization only a truncated portion of the region where the risks are acceptable. The invention may also use such forms of risk-limiting constraints as fines and penalties that perform the same role, namely, they limit the possibility of undesirable outcomes, but in a weaker (non-mandatory) form. More specifically, while the risk-limiting constraints in the form of equations and inequalities set the absolute limits (boundaries) of outcomes in risk-related activities that cannot be exceeded in the LP model solution, the constraints in the form of fines and penalties adversely affect the movement toward or over the boundaries, but do not categorically forbid it.

The risk-limiting constraints, including fines and penalties, can be added to the LP model in any order and way desired. If they are added iteratively, one by one or in groups, starting from different outcome levels for various risk-related activities, the resulting truncated feasible regions may differ, as differ the solutions of the evolving models. This procedure leads to the generation of different candidate strategies, with diverse acceptable tradeoff combinations of outcome levels in various risk-related activities.

Optimization models are full of constraints of both types, but these predominantly are either constraints on the available capacities and other resources, or constraints on meeting the given production targets, or "balancing" equations that balance inputs and outputs in space and in time. In contrast, risk-limiting constraints are constraints on results.

In turn, risk-limiting constraints on results can be classified in two categories; both can be of the equation-inequality type and of the fine-penalty type. The first category is "predetermined" constraints that, for instance, prohibit too great amount of waste water to be generated at a plant. These constraints are based on established norms, laws, and regulations that are known in advance. The constraints of the second category are not known in advance: they are based on computational results attained for the models.

In spite of the obvious advantages of adding explicit risk-limiting constraints of the second category, only one source is known to apply them, although in their simplest embryonic form. In "The uses of previous experience in reaching statistical decisions," Annals of Mathematical Statistics, 23, 396–407, 1952, Hodges and Lehmann suggest finding a decision that minimizes the maximum possible risk; let this maximum risk value be C. Then the level of "maximum tolerable risk" is chosen that is lower than C. The use of maximum tolerable risk as an auxiliary criterion in selecting a best strategy is tantamount to imposing a single and simple risk-limiting constraint of the second category.

This invention not only widely uses multiple risk-limiting constraints of the second category, it also introduces a new type of such constraints, namely, constraints on results of individual risk-related activities under individual scenarios or groups of scenarios. The constraints are mostly discretionary and allow the user to find and analyze best tradeoffs. The constraints of this category can be easily applied only in multiscenario optimization models specific for this invention that come next. This explains why such constraints have not been used previously.

Second, this invention uses multistage, multiscenario LP models that include the risk-limiting constraints above.

Similar but simpler models are utilized in stochastic programming. However, the multiscenario models make a novel and extremely effective combination with risk-limiting constraints.

Third, this invention constructs alternative strategies, tests their performance under different scenarios, evaluates the risk associated with each strategy, and tailors each candidate strategy to the risk attitude and personal preferences of DMs.

For that purposes, this invention introduces two concepts, "strategic variables" and "candidate strategy." "Strategic variables" originate from optimization models, such as LP models described above; they usually are a small subset of variables selected from the whole set of the variables of the model. Strategic variables are the key decision variables, especially the variables associated with immediate and irrevocable decisions, that should keep their values stable or even constant under different conditions (scenarios). For instance, in the distribution problem described above, the subset of strategic variables may be limited to the production targets at all industrial enterprises of the system. All other quantities to be determined, such as inventory levels or transportation flows, correspond to less important, non-strategic variables of the model. If the number of strategic variables in a problem is K, then a set of values of all K strategic variables contained within the same segment defines a "candidate strategy."

The strategic variables used in the present invention are partly similar to the "first-stage variables" in two-stage and multistage stochastic LP models; see, for instance, Chapter 16 in Harvey M. Wagner, "Principles of Operations Research," Prentice-Hall, Inc., Englewood Cliffs, N.J., 1969, pp. 657–668 and 678–684. However, strategic variables are different from the first stage variables. They do not necessarily belong to the first stage. Furthermore, there is no concept in OR/MS similar to the "candidate strategy," where the strategy is defined not by the total solution of an LP model, but rather by the values of a small subset of a model's variables.

Fourth, this invention focuses on a relatively small number of strategic variables, instead of all variables of the computational model used, and scenario submodels of the multiscenario model are connected only through values of strategic variables. Combined with an understanding that a good solution of a multiscenario model must also be good under the worst scenarios, this feature brings about unexpected but crucial computational benefits. This invention offers a novel, highly efficient and quickly converging decomposition method, in which the boundary limits on the values of strategic variables are derived from solutions of worst scenario submodels, and then extended to all other scenarios.

Fifth, this invention introduces novel, synthetic regret-based methods, or optimality criteria of DS, for comparing candidate strategies. They are accompanied also by a novel, "regret-based efficient frontier," which is developed both in analytical and graphic form.

The definition of efficient frontier in Portfolio Theory has been given earlier; in this invention, efficient frontier is defined differently, as the set of strategies that are the best for the full range of expectations, from the optimistic to the pessimistic end.

It should be pointed out that these methods can, as a practical matter, be executed only on a computer, because they are used within a complex computer-based framework with multiple interconnected criteria and decision graphs, and in some (especially financial) applications may have to be repeated a large number of times.

Sixth, this invention combines the multitude of jointly used diverse DS criteria by means of conversion coefficients, or weights. Obviously, the values of these coefficients can be known at best approximately. Therefore the joint use of many criteria is considered not as a final and conclusive step, but just as one of many ways to analyze and compare strategies.

Weighting diverse optimality criteria in multicriterion models to merge them into a single criterion model, such as LP, is a technique well known in state-of-the-art methods. Weighting such disparate model results as, e.g., waste water and financial loss, may also have been used before. This invention introduces a new element to the weighting approach, whereby several values of the weights are used simultaneously, which is achieved by increasing the number of scenarios.

This invention has several major components. It:

(a) Adds risk-limiting constraints (which include equations, inequalities, fines, and penalties) to the main decision-making formula or model for decision-making both under certainty and uncertainty;

(b) Offers a method of risk protection and management by imposing risk-limiting constraints that are not only more reliable but also simpler than those generated by state-of-the-art methods and therefore can be added to the main model or formula by people not skillful in the art of modeling;

(c) Develops compromise candidate strategies on the basis of either multiple single-scenario, or single multiscenario, or multiple multiscenario mathematical programming models, all with additional risk-limiting constraints;

(d) Solves extremely large multiscenario mathematical programming models by a novel decomposition method that efficiently uses the information derived from solutions of submodels for worst scenarios;

(e) Develops multiple scenarios and multiple candidate strategies; groups and clusters scenarios and strategies, whenever this is necessary because of the computational effort involved; and declusters, reclusters and regroups the scenarios and strategies whenever these operations can improve the analytic and decision support capabilities of the method;

(f) Presents the "strategy versus scenario" results in the format of two multidimensional matrices, an outcome matrix and a regret matrix, and then applies different methods and criteria of DS, including special methods of this invention, to help, first, in screening out the worst strategies, and second, in selecting a strategy;

(g) Uses special synthetic methods for selecting a strategy based upon comparing the potential reduction of risk (regret) with the sacrifices needed to achieve that risk reduction, as well as upon weighting the outcomes achieved under different criteria;

(h) Compares the candidate strategies in an analytical and graphical framework of "efficient frontier (regret)," which not only provides excellent help in decision-making, but also minimizes the negative impact of uncertainty;

(i) Simultaneously applies several values of weights to combine: diverse optimality criteria; model outcomes in different risk-related activities; opinions and attitudes of different decision-makers; and different qualitative characteristics.

In FIG. 1, a flow chart illustrating application of the invention to the management of risk under conditions of certainty begins with step 11, in which an initial symbolic model of the physical systems of interest is stored in computer memory. From there, the method moves through step 13, in which parameter values are entered in memory, to step 15, in which boundary limits which are not to be exceeded are entered in memory. From step 15, the method moves through step 17, in which a computational model of the physical systems is generated in computer memory, to step 19, in which the computational model is solved. From step 19, the method moves through step 21, where I is the number of times the computational model has been solved and is initially set equal to 1, to step 23, where outcome levels of the various activities of the physical systems are obtained.

In FIG. 1, the illustrated method moves from step 23 to decision point 25, where the outcome levels from step 23 are compared with the boundary limits entered in step 15. If the answer at decision point 25 is yes (i.e., all outcome levels are within boundary limits), the method moves to and terminates in step 27, in which the boundary limits are implemented in the physical system or systems. If the answer at decision point 25 is no (i.e., at least one outcome level is outside of the boundary limits), the method moves to decision point 29, where it is determined whether or not I is still equal to 1. If the answer at decision point 29 is yes (i.e., the model has only been solved once), the method moves to step 31, in which risk-limiting constraints triggered by the solution in step 19 are added to the computational model. The next step is then step 33, in which the expanded model is solved. Following step 33, the method moves to step 35, in which I is incremented by 1 to indicate that the model has been solved another time (e.g., for a second solution, I=2). The method then moves back to step 23, where outcome levels are obtained.

After step 23, the method moves again to decision point 25, where it terminates in step 27 if the answer is yes and moves to decision point 29 if the answer is no. If the answer at decision point 29 is no (as it will be if I is greater than 1), there will be no feasible solution unless the boundary limits are modified, so the method moves to step 37, in which one or more of the boundary limits are modified. Following step 37, the method moves to step 39, in which the risk-limiting constraints added to the model at step 31 are modified. From step 39, the method proceeds to step 33, in which the expanded model is solved again.

As explained in the "Background" section of this specification, decision-making problems and situations usually are very complicated. Unable to deal properly with all complexities, humans make decisions following some approximate "rules of thumb" that may produce both good and bad decisions. The most glaring common flaw of most "rule of thumb" decisions is insufficient attention to risk.

A main premise of this invention is that, in order to protect and insure physical systems from risk, decision-makers (DMs) must explicitly limit the outcome levels of risk-related activities, usually in the form of risk-limiting constraints. This brings about two important consequences. First, the addition of constraints transforms even simple models into more complicated versions, which cannot be solved in reasonable time without computers. Second, the state-of-the-art optimization models currently used in these complicated decision-making situations, when applied without due attention to risk, are insufficient and often counterproductive, because any optimization model adds a substantial risk component of its own. This invention provides the techniques necessary for overcoming such difficulties.

As a rule, both these consequences are true even in the relatively simple case of decision-making under certainty. Consider a physical system under certainty, where DMs know the exact single value of each system parameter that is needed to determine the future behavior of the system under different conditions and, therefore, to make a decision. The system performs interrelated activities. Some of them are risk-related, that is, the outcome levels for these activities may fall outside some predetermined boundary limits, and that causes concern for DMs. The decisions to be made about the system specify the planned levels for some, but not all, activities, such as the utilization of limited or costly resources, or the outputs of some products. Because of the complexity of both internal and external connections, relationships, and reactions of the system, the outcomes of other activities, including the risk-related ones, are not obvious. These other outcomes are determined by a special model of the system. The unique set of outcome values for all activities of the system, defined by the model on the basis of the decisions to be made, is called "a solution." The model also includes a set of criteria that determine which solution is "the best," that is, which one to choose for implementation among many candidate decisions. The model thus not only describes the physical system, but also assists in decision-making.

Suppose that, using the model of the system, DMs made a decision and determined all outcomes coming from that decision. Suppose also that, after comparing the outcome levels for risk-related activities with the predetermined boundary limits, DMs discovered that some outcomes fall outside these limits. As a rule, as indicated in the "Background" section, the only way to guarantee meeting all limits is then to explicitly append to the initial model the additional risk-limiting constraints, usually in the form of equations and inequalities.

This rule has an exception. Suppose that we have a simple system, such as choosing an appliance like a washing machine. The model of the system is also extremely simple: it is just a list of "attribute packages" that assigns to each type and make of machine the relevant values of performance attributes, such as features, quality, price, and service levels. The selection procedure is just compiling a list of machines that have the desired attributes ("capacity no less than . . . , quality no less than . . . , etc.") and then choosing from that list the lowest price machine. Let the risk-related activity be the monthly cost of energy, which was not included among the attributes, and the DMs want this cost not to exceed x dollars. DMs can avoid here using the model with an explicitly added risk-limiting constraint in the form of an equation or inequality, such as "monthly energy cost no more than $x," in two ways: either this item is added to the attributes and then the list of machines is further purged by removing all machines that do not meet this criterion; or, if a machine's monthly energy bill is $y and y>x, the selection is performed not on the price of the machine, but on the total of price plus fine, where the fine may depend on the value of (y−x).

If the model of the system is more complex than just a list of "attribute packages," so that the risk-limiting constraints in the form of equations or inequalities must be added to the model explicitly, the resulting model becomes one of a "constrained optimization" mathematical programming type, which as a rule can be solved in reasonable time only on a computer. There are various versions of mathematical programming, such as linear programming (LP), non-linear programming, integer programming and so on. For simplicity, this discussion will not go beyond LP, but the arguments and conclusions do not depend on which type of optimization model is used.

Suppose that, prior to addition of risk-limiting equations and inequalities, the decision-support LP model is described, in matrix notation, by (1), which contains expressions (1.0) through (1.2):

Find a $(n \times 1)$ vector $X$ to

Maximize $\quad ZD = C^T X \qquad (1.0)$ subject to $\quad AX = B \qquad (1.1)$ and $\quad X \geq 0. \qquad (1.2)$ Superscript $^T$ represents a matrix transposition operation. Model (1) comprises: a vector X of variables x[q] (q=1, . . . , n) that define the levels of activities q of the physical system; m equations (1.1) imposed on limited resources, product outputs, and interconnections between activities q; n non-negativity conditions (1.2) on variables x[q]; and an objective function ZD—a scalar product of two vectors C and X of dimension n defined by (1.0). The value of ZD is the difference between benefits and costs; it is to be maximized.

All components of vector C=(c[q]) and (m×1) vector B=(b[p]) and of (m×n) matrix A=[a[p][q]] (p=1, . . . , m; q=1, . . . , n) are calculated on the basis of values of parameters of the physical system and stored in the computer memory. Variables x[q] correspond to levels of activities q (that is, scale of operations or output of products or use of resources) of n interconnected activities q. Equations (1.1) are m linear equations with coefficients a[p][q] on n variables x[q]. These equations have right-hand sides b[p]. Equations (1.1) connect levels of operations or specify the output of products or limit the use of resources for activities q. In the exceptionally simple case of an appliance described above, there are no equations (1.1), so m=0. Objective function (1.0) is a linear function of variables x[q].

As mentioned before, the last R of n activities of the physical system (j=n–R+1, . . . , n) are risk-related activities that are of special concern to the DMs. The values of the corresponding variables x[j] determine levels of these activities, such as the outputs of some dangerous by-products. For simplicity, here and in subsequent models (3) and (4) assume that the predetermined boundary limits for these R activities are one-sided, that is, the outcome for an activity is limited by only one upper boundary—say, it should be no greater than this boundary limit.

Again, if DMs have solved model (1) and have obtained the values of outcomes for all risk-related activities, and if all outcomes are no greater than the corresponding boundary limits, then the decision based on that solution is acceptable to DMs, and the computations can be stopped. However, if at least one outcome exceeds the boundary limit for the corresponding activities, then the model (1) must be expanded into the model (1A), which contains expressions (1.0A) through (1.5A):

Find (n×1) vector X and (R×1) vectors W and Y to

Maximize $\quad ZD = C^T X - F^T Y \qquad (1.0A)$ subject to $\quad AX = B, \qquad (1.1A)$ $X_R + W - Y = BL, \qquad (1.2A)$ -continued $X \geq 0, \qquad (1.3A)$ $W \geq 0, \qquad (1.4A)$ and $\quad Y \geq 0, \qquad (1.5A)$ where: $X_R$ is an (R×1) vector of outcomes (where $X_R$ is a subset of the set x) for risk-related activities, which are the last R of n activities; BL is an (R×1) vector of boundary limits for the same set of activities; W and Y are, respectively, (R×1) vectors of zero priced "slack variables" and highly fined "artificial variables" that transform risk-limiting inequalities into equations; and F S is a (1×R) vector of fines f[q] (q=N–R+1, . . . , n) that is imposed on the excessive portions y[q] of outcomes that exceed the boundary limits BL[q] (q=n–R+1, . . . , n). Equations (1.2A) are R risk-limiting inequalities transformed into equalities by adding slack variables W and subtracting artificial variables Y, while (1.4A) and (1.5A) are non-negativity conditions for these variables. The transformation of model (1) into model (1A) can be performed either all at once for all R risk-related activities, or iteratively, adding equations (1.2A) only for those activities where the outcomes in the previous solution exceed the boundary limits.

It is important to notice that, even if model (1) is simple enough to be solved manually (for instance, if the number m of "structural" equations (1.1) that describe the physical system equals zero), model (1A) still becomes an LP model, sufficiently complicated to be solved in a reasonable time only on a computer.

It is also important that DMs cannot be sure that the values of the predetermined boundary limits BL[q] (q=n–R+1, . . . , n) are correct or correspond to real capabilities of the physical system, especially if these values do not allow for obtaining a feasible solution of model (1A), that is, a solution where all outcomes are within the boundary limits and therefore Y=0. Therefore DMs' actions may include modifying the values of these limits.

The method of DMs' behavior in finding the solution for a physical system under certainty can easily be followed on the flow chart of FIG. 1. After formulating the initial symbolic model (1) and storing it in computer memory together with the values of the relevant parameters and boundary limits, DMs:

generate the computational model (1)—steps 11–17;

solve model (1) by any appropriate means and, if model (1) is an LP model, by any appropriate computer LP system—step 19;

record in the computer memory the values of outcomes obtained from the optimal solution of model (1) for each of R risk-related activities—step 23;

compare the outcome with the boundary limit for each risk-related activity and decide whether the obtained set of outcomes is fully acceptable for all such activities—step 25;

if this set of outcomes is fully acceptable, the method is completed—step 27;

otherwise, DMs add to model (1) risk-limiting constraints, transform it into model (1A)—step 31, and solve model (1A) by any appropriate computer LP system—step 33;

again, compare the outcome with the boundary limit for each risk-related activity and decide whether the obtained set of outcomes is fully acceptable for all such activities—step 25;

if the set of outcomes is acceptable, the method is completed—step 27;

otherwise, modify the boundary limits and the corresponding risk-limiting constraints and solve the resulting model (1A)—steps 37, 39, and 33; and continue the procedure of modification of boundary limits until an acceptable solution of model (1A) is found, which completes the method—steps 37, 39, and 33.

Figure 2:
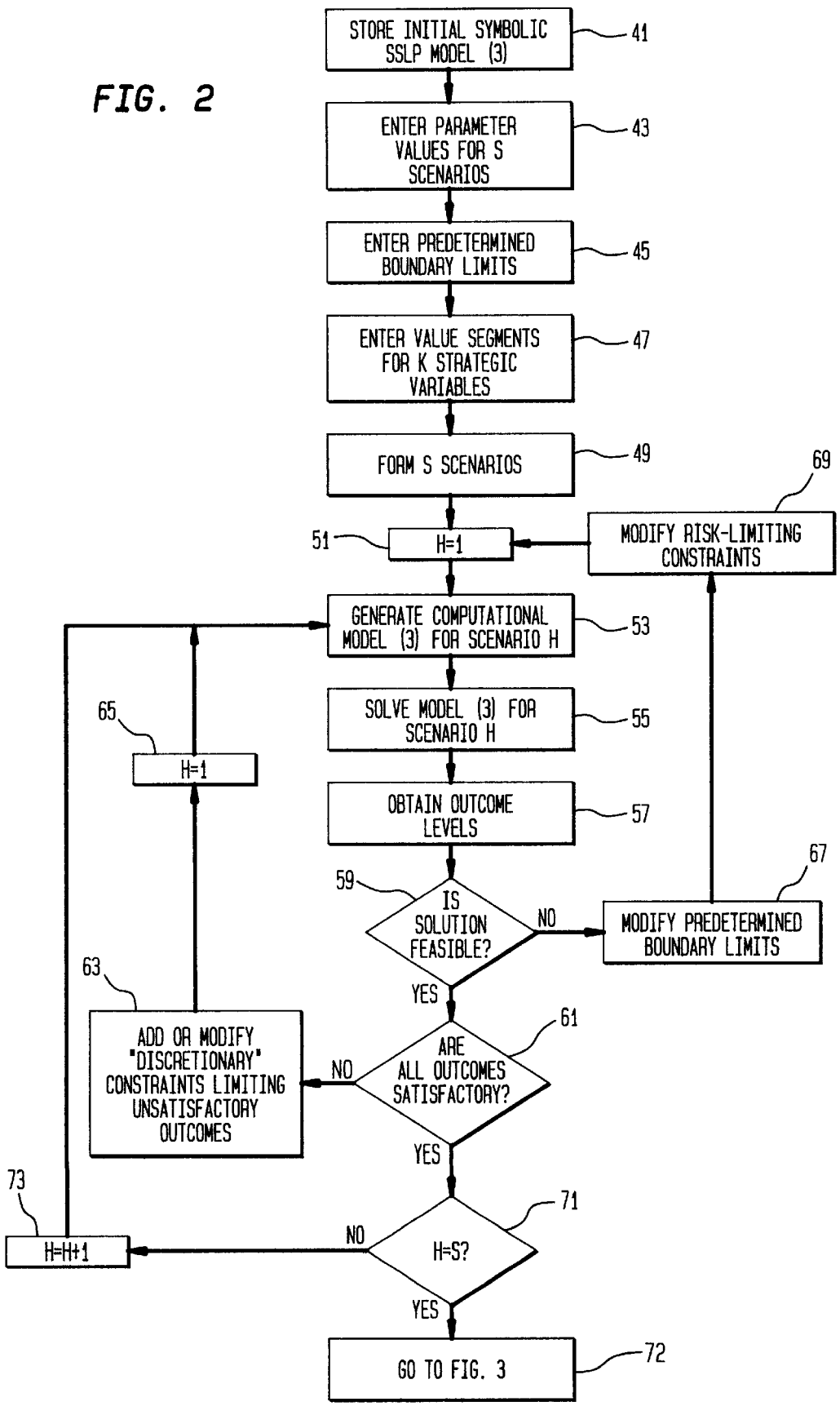
FIG. 2 is part of a flow chart of a computer method, in accordance with the invention, for managing risk under conditions of uncertainty, using single-scenario LP models.

In FIG. 2, a flow chart illustrates a method applying the invention to the management of risk under conditions of uncertainty by using SSLP (single-scenario linear programming) models. The method begins with step 41, in which an initial symbolic SSLP model (3) is stored in computer memory. Next, the method moves to step 43, in which the parameter values for S different scenarios are entered into computer memory. After step 43, the method moves to step 45, in which any predetermined boundary limits for the various outcome values are entered. Following that, step 47 enters value segments for K different strategic variables. Step 49 forms S scenarios, each made up of a different combination of the certain parameters with a value for each uncertain parameter. After step 49 comes step 51, which sets H equal to 1 to indicate the index of the first of the S different scenarios, where H is the index number of the scenario being tested.

In FIG. 2, the illustrated method next moves to step 53, where a computational model (3) is generated in computer memory for scenario H. After that comes step 55, where the computational model for scenario H is solved, and step 57, which obtains outcome levels from the solution of scenario H. Following step 57, a decision point 59 determines whether or not the solution is feasible (i.e., whether all its outcome levels are simultaneously achievable). If the answer is yes, the method moves to decision point 61, which determines whether or not the outcomes are all satisfactory. If the answer is no, the method moves to step 63, which adds or modifies discretionary constraints to the model in computer memory to limit unsatisfactory outcomes. Next, step 65 sets H equal to 1 to indicate that the method begins again with scenario 1. The method returns then to step 53 to generate a modified or expanded computational model for scenario H=1.

If the answer at decision point 59 is no, the method moves to step 67 to modify the predetermined boundary limits. Next, the method moves to step 69, modifying any previously entered risk-limiting constraints that are included into model (3) in computer memory.

If the answer at decision point 61 is yes, the method moves to decision point 71 to determine whether H is equal to S, where S is the total number of scenarios being tested. If H is not equal to S (that is, less than S), the method moves to step 73, where H is incremented by 1, and back to step 53 to generate the computational model (3).

Figure 3:
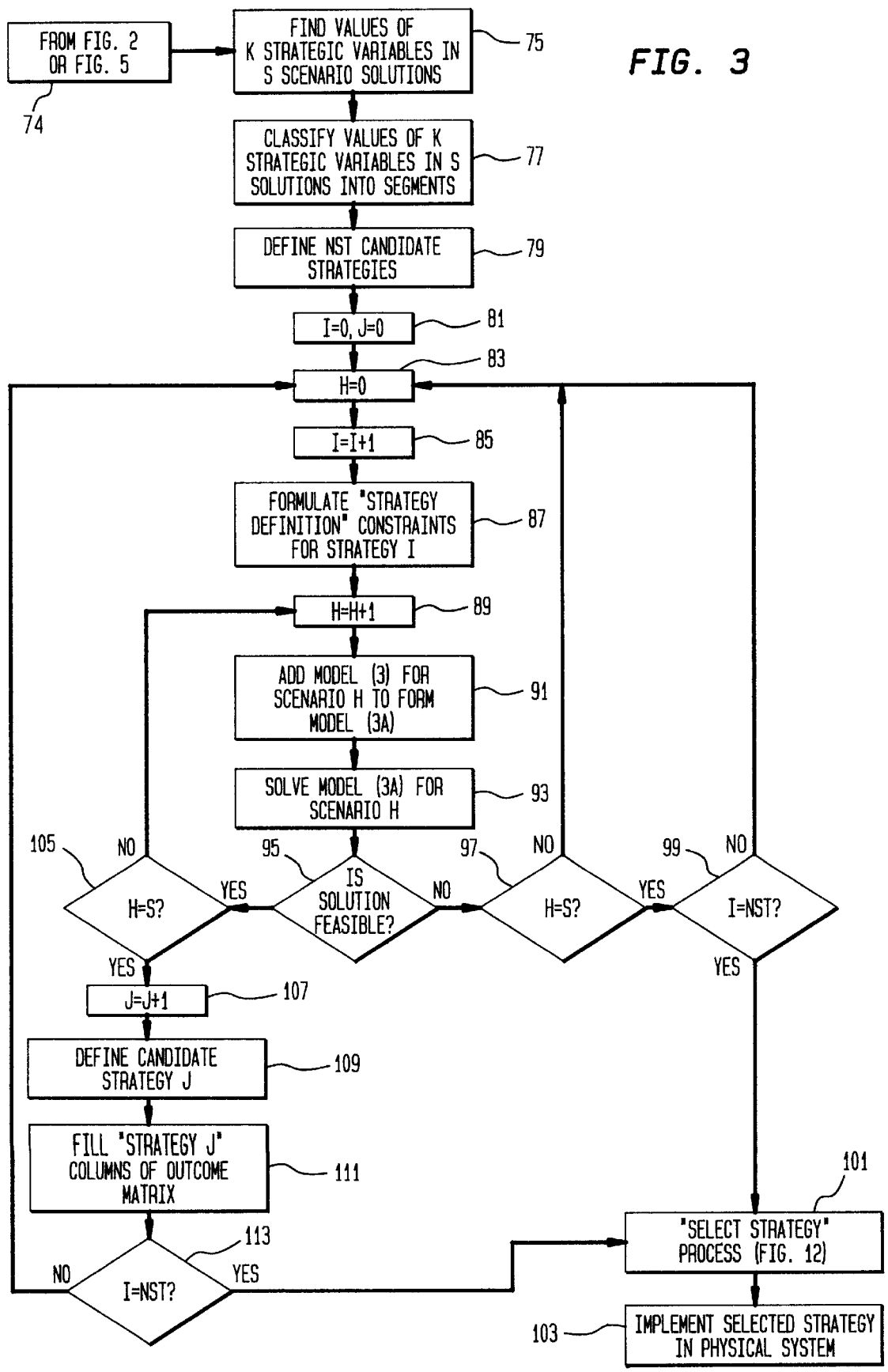
FIG. 3 is a continuation of the flow charts in FIG. 2 and FIG. 5.

If the answer at decision point 71 is yes, the method moves to the flow chart in FIG. 3, which begins with step 74 and moves to step 75 to find the values of K strategic variables in S scenario solutions, where K is the total number of strategic variables. In FIG. 3, the method then moves to step 77, which classifies values of K strategic variables in S solutions into predetermined segments. From step 77, the method moves first to step 79, which defines NST candidate strategies, where NST is the total number of candidate strategies, and then to step 81, which sets I and J both equal to zero, where I is the index of the strategy being tested (the range of I is from 1 to NST) and J is a count of the strategies which have already been tested and accepted. From there, the method moves to step 83, which sets the scenario index H equal to zero.

From step 83 in FIG. 3, the method moves first to step 85, which increments I by 1, and then to step 87, which formulates strategy definition constraints for strategy I. The next step in the method is step 89, which increments H by 1. From step 89, the method moves first to step 91, which adds a model (3) for scenario H to form a computational model (3A), and then to step 93, which solves this model for scenario H. After step 93 comes decision point 95, where it is determined whether or not a solution to the computational model (3A) is feasible in the sense that it meets all predetermined boundary limits on risk-related activities.

If the answer at decision point 95 is no, the method moves to decision point 97, where it is determined whether H is equal to S. If the answer is no, the method returns to step 83. If the answer is yes, the method proceeds to decision point 99, where it is determined whether I is equal to NST. If the answer is no, the method again returns to step 83. If the answer is yes, the method proceeds first to step 101, which is the strategy selection process illustrated in FIG. 12, and then to final step 103, which implements the selected strategy in the physical system or systems.

If the answer at decision point 95 in FIG. 3 is yes, the method moves to decision point 105, which determines whether H is equal to S. If the answer at decision point 105 is no, the method returns to step 89. If the answer is yes, the method moves to step 107, which increments J by 1. From step 107, the method moves first to step 109, which defines candidate strategy J, and then to step 111, which fills "strategy J" columns of a matrix of outcomes. From step 111, the method proceeds to decision point 113, which determines whether I is equal to NST. If the answer is no, the method returns to step 83. If the answer is yes, the method goes on to step 101 and, from there, to final step 103.

Two difficulties (i.e., the complication of a decision-support model and the insufficiency of currently used approaches to applying optimization models) involved in making decisions about physical systems are outlined in the beginning of this detailed description. They are even more important if the system is under uncertainty, that is, when some parameters of the system are not known exactly and therefore may be represented by not one value but rather by a multitude of different possible values.

Suppose we are to make decisions about a physical system with multiple parameters that performs n interrelated activities. Some of these activities are use of resources, manufacturing of products, storage or transportation activities, and so on. Let R (n>R≧1) of these n activities be potentially dangerous, risk-related activities. The decisions to be made are about the planned levels of these n activities; each of these levels must be non-negative. The decisions will be based on the values of multiple parameters of the physical system. Due to uncertainty, G (G≧1) of these parameters have g[q]>1 values (q=1, . . . , G); each of the remaining parameters has only one value. The maximum number MS of all respectively different combinations of possible values of all parameters of the physical system is given by (2):

$$MS = \prod_{i=1}^{G} g[i]; \qquad (2)$$

where the symbol π is used to denote "product of."

Each of these respectively different combinations of possible values of all parameters of the system we will call a "scenario." Then we can form S (1<S≦MS) scenarios and store these scenarios in computer memory.

To construct candidate strategies, the method of this invention uses an LP model, which in the general case is a multiscenario linear programming model (MSLP) that has LS scenarios, where LS may vary from one to S. If LS<S, then, to cover all S scenarios of the problem, the method runs multiple MSLP models, each having up to LS scenario submodels. The greater the portion of S covered by LS, the more effective is the method. However, sometimes, due to the size of the LP problem, LS has to be small.

In an extreme case, when LS=1, MSLP becomes a single-scenario LP (SSLP—single-scenario linear programming) model. Suppose that, given one scenario H, the computer generates for that scenario H an SSLP model. This model has, however, a major distinction from model (1). As mentioned before, the last R of n activities q of the physical system (q=n−R+1, . . . , n) are risk-related activities that are of special concern to DMs; the values of the corresponding variables x[j][H] define levels of these activities, that is, for instance, the output of some dangerous by-products under scenario H. Decision-making under uncertainty involves more operations than decision-making under certainty, and it is very likely that, at some operation, risk-limiting constraints for predetermined boundary limits in R risk-related activities would be included in the decision model. Model (3), which, from the very beginning, includes these constraints and thus is similar to model (1A), should therefore serve as the principal model, both symbolic and computational.

For each scenario H, H =1, . . . S, model (3) in matrix notation contains expressions (3.0) through (3.5):

Find (n×1) vector X[H] and (R×1) vectors W[H] and Y[H] to Maximize ZM=1.0×ZS[H]

$$= 1.0 \times C[H]^T X[H] - F^T Y[H] \quad (3.0)$$

$$\text{subject to} \quad A[H]X[H] = B[H], \quad (3.1)$$

$$X_R[H] + W[H] - Y[H] = BL, \quad (3.2)$$

$$X[H] \geq 0, \quad (3.3)$$

$$W[H] \geq 0, \quad (3.4)$$

and $$Y[W] \geq 0. \quad (3.5)$$

Superscript $^T$ represents a matrix transposition operation. Model (3) comprises a column vector X[H] of variables X[q][H] (q=1, . . . , n) that define the level of activities q of the system under scenario H; $X_R$[H] is an (R×1) vector of outcomes (where $X_R$ is a subset of the set X) for risk-related activities, which are the last R of n activities; BL is an (R×1) vector of boundary limits for the same set of activities, and these limits are invariant of scenarios; W[H] and Y[H] are, respectively, (R×1) vectors of zero priced "slack variables" and highly fined "artificial variables" that transform risk-limiting inequalities into equations; and F is an (1×R) vector of fines F[q] (q=n−R+1, . . . , n), also invariant of scenarios, that is imposed on the excessive portions y[q][H] of outcomes that exceed the boundary limits BL[q] (q=n−R+1, . . . , n). An objective function ZS[H] is defined by (3.0). The value of the objective function ZS[H], which is the difference between benefits and costs, is to be maximized. Equations (3.2) are R risk-limiting inequalities transformed into equations by adding slack variables W[H] and subtracting artificial variables Y[H], while (3.4) and (3.5) are non-negativity conditions for these variables. Inequalities (3.3) guarantee non-negativity conditions for variables X[H].

All components of (1×n) vector C[H]=(c[q][H]) and of (m×1) vector B[H]=(b[p][H]) and of (m×n) matrix A[H]= [a[p][q][H]] (p=1, . . . , m; q=1, . . . , n) are calculated and stored in the computer memory on the basis of values of all parameters of the physical system in scenario H. Variables x[q][H] correspond to decisions that, under scenario H, define levels of activities (that is, scale of operations or output of products or use of resources) in n interconnected activities q. Equations (3.1) are m linear equations with coefficients a[p][q][H] on n variables x[q][H]. These equations have right-hand sides b[p][H]. Equations (3.1) connect levels of operations or limit the output of products and use of resources in activities q. Objective function (3.0) is a linear function of variables x[p][H].

In addition to developing scenarios, the method of this invention develops candidate strategies. To define a strategy, DMs select, out of large number n of variables x[q][H] of the SSLP model, a small number K, K being substantially less than n, of key (or strategic) decision variables, say, first K variables x[q][H] (q=1, . . . , K). These K strategic variables are the same for all scenarios and for all SSLP scenario models. They correspond to the most important decisions or to important immediate and irrevocable decisions. A candidate strategy I (I=1, . . . , NST) is then defined as a vector of length K of numerical values for K strategic variables, with NST being the expected number of candidate strategies to be obtained from classification of the values of K strategic variables into segments.

The centerpiece of the structure of this invention is the "outcome matrix" (OM), which is a three-dimensional array of outcomes of risk-related activities, systematized in the "strategy versus scenario versus risk-related activity" format. The dimensions on the three corresponding axes are NST×S×R, where NST is the number of strategies, S is the number of scenarios, and R is the number of risk-related activities, so we must reserve in computer memory the necessary space for such an array, as well as for the regret matrix derived from the outcome matrix. (The number of dimensions may be greater than three.)

The compressed, highly aggregated results accumulated in the outcome and regret matrices serve two main purposes. First, they allow easy generation of non-predetermined, discretionary risk-limiting constraints and therefore help to form and modify candidate strategies. Second, they allow the strategies to be analyzed and compared.

If SSLPs are used, this method has to generate strategies from S solutions of SSLP models. In comparison with using an MSLP, this may be a drawback, because compromise strategies resulting from MSLP tend to fit diverse conditions better. Also, the values of strategic variables in multiple solutions of an SSLP tend to differ somewhat, even if these solutions are close, so strategies have to be defined not by exact values of variables, but by value segments where they belong. In using the method with an SSLP, DMs expect that S, the number of scenarios, is sufficiently large, so at least one of S solutions will generate a good candidate strategy.

The method of constructing candidate strategies and filling in the outcome matrix via SSLP models comprises three parts. First, it finds both feasible and satisfactory solutions of models (3). (The difference between "feasible" and "satisfactory" is defined here as follows. A "feasible" solution meets all predetermined boundary limits on risk-related activities, which are identical for all scenarios. A "satisfactory" solution meets the predetermined limit, but also meets additional, "discretionary" limits on individual outcomes of specific risk-related activities under some specific scenarios, if DMs find these outcomes excessive or wish to find and explore a tradeoff.) Second, it splits the total value range for each of K strategic variables into one or more segments, assigns the values of these variables in each solution of an SSLP scenario model to the relevant segments, and then forms multiple candidate strategies based on different combinations of these segments that have occurred in S solutions. Finally, the method adjusts the candidate strategies to diverse conditions of all S scenarios and records the outcomes in the format of an outcome matrix.

The first part of the method of using SSLP in forming the strategies for a physical system under uncertainty can easily be followed on the flow chart of FIG. 2. After generating the initial symbolic model (3) and storing it in the computer memory together with the values of the relevant parameters, predetermined boundary limits, and value segments for strategic variables, DMs:

form S scenarios—step 49;

in turn, formulate the computational SSLP model (3) for each H (H=1, ..., S), which includes R risk-limiting constraints for all risk-related activities—step 53;

solve the model by any appropriate computer LP system—step 55;

record in the computer memory the values of outcomes obtained in the optimal solutions of model (3) for each scenario H and for each of R risk-related activities—step 57;

if a feasible solution of (3) is not obtainable for at least one H, it means that some predetermined boundary limits are too tight, so modify the boundary limits and the corresponding risk-limiting constraints and start solving again the resulting models (3)—steps 67 and 69;

continue the procedure of modification of boundary limits until feasible solutions of models (3) are found for all H—steps 51 to 59, 67 and 69;

decide whether the obtained set of outcomes is not yet fully satisfactory for all such activities under all conditions, that is, whether these outcomes, although all within the boundary limits, should not be further "discretionally" limited for some specific scenarios and some specific activities—steps 61, 63, and 65;

if so, add the desirable "discretionary" limits and the corresponding risk-limiting constraints and solve again those of the resulting models (3) for the relevant scenarios and continue the procedure of adding or modifying the discretionary limits until satisfactory solutions of models (3) are found for all relevant scenarios—steps 53 to 61, 63 and 65; and obtain solutions of models (3) with the final set of discretionary constraints for all S scenarios—steps 53 to 61, 71 and 73.

The second and third parts of the method of using SSLP in forming the strategies for a physical system under uncertainty can easily be followed on the flow chart of FIG. 3. After finding the values of K strategic variables in all S solutions of scenario models (3) and classifying these values in each solution by placing them in the value segments they belong to, DMs:

define each set of segments for K variables encountered in at least one solution as a candidate strategy, forming NST (NST≧1) candidate strategies, where NST is already not an expected but known number of strategies—steps 75, 77, and 79;

add "strategy definition" constraints (3.6) to model (3), in turn forming models (3A) for each of the candidate strategies I (I=1, ..., NST) and for each scenario H, with each of the models (3A) consisting of expressions (3.0) through (3.6):

$$LB\,[I] \leq XK[H] \leq UB\,[I], \quad (3.6)$$

where XK[H] is a vector of strategic variables (where XK[H] is a subset of the set X[H]), while LB[I] and UB[I] are lower bounds and upper bounds for the relevant value segments, respectively, for strategy I (I=1, ..., NST)—steps 83, 85, 87, 89, and 91;

for each candidate strategy I, solve S scenario models (3A)—step 93; and if all S solutions are feasible, consider strategy I a viable candidate J and fill its outcomes for R risk-related activities and for S scenarios into the corresponding columns of the outcome matrix—steps 95, 105, 107, 109, and 111;

otherwise, switch to analyzing the next candidate strategy (I+1)—step 97.

After completing the procedures displayed in FIG. 2 and FIG. 3, the method with SSLP proceeds to the strategy selection procedure to be described later in connection with FIG. 12.

To construct candidate strategies and to fill in the outcome matrix via an MSLP model, this invention uses a different method. The MSLP model generates not a multitude of solutions, but a single solution that is a compromise for diverse scenarios. However, similar to SSLP (3), from the very beginning, MSLP (4) also includes risk-limiting constraints for the predetermined boundary limits.

The MSLP model (4) contains expressions (4.0) through (4.8), where SN=S×n, SR=S×R, and SK=S×K:

Find (SN×1) vector X, X=(X$_1$, ..., X$_S$), and (SR×1) vectors
XR, XR=(XR$_1$, ..., XR$_S$),
W, W=(W$_1$, ..., W$_S$),
Y, Y=(Y$_1$, ..., Y$_S$),
and (SK×1) vectors
XK, XK=(XK$_1$, ..., XK$_S$),
XKP, XKP=(XKp$_1$, ..., XKp$_S$),
and XKM, XKM=(XKm$_1$, ..., XKm$_S$), to $$\text{Maximize } ZM = \sum_{H=1}^{S} u[H]ZS[H] = \sum_{H=1}^{S} u[H](C[H]^T X_H - F^T Y_H) \quad (4.0)$$

$$\text{subject to} \quad A[H]X_H = B[H], \quad (H=1,...,S) \quad (4.1)$$

$$X R_H + W_H - Y_H = BL, \quad (H=1,...,S) \quad (4.2)$$

$$X_H \geq 0, \quad (H=1,...,S) \quad (4.3)$$

$$W_H \geq 0, \quad (H=1,...,S) \quad (4.4)$$

$$Y_H \geq 0, \quad (H=1,...,S) \quad (4.5)$$

$$XK_H - XK_1 + XKP_H - XKM_H = 0, \quad (H=2,...,S) \quad (4.6)$$

$$0 \leq XKp_H \leq UB, \quad (H=2,...,S) \quad (4.7)$$

$$0 \leq XKm_H \leq UB. \quad (H=2,...,S) \quad (4.8)$$

In effect, the MSLP model (4) consists of S submodels (4.1)–(4.5) for S scenarios H and of K(S−1) "intersubmodel" parts (4.6)–(4.8). The submodels are paired with the corresponding summands ZS[H] of the objective function ZM described by (4.0). The submodels H correspond to SSLP (3) with the values of components of their vectors C[H] and B[H] and matrices A[H] derived in the computer from the values of physical system parameters taken from the corresponding scenario H. Summands ZS[H] are weighted by coefficients (based on scenario probabilities) u[H] of the corresponding scenarios H.

In model (4): X is an (SN×1) vector of activity levels for n activities under S scenarios; XR is an (NR×1) vector of outcomes (where XR is a subset of the set X) for risk-related activities, which are the last R of N activities, under S scenarios; BL is an (NR×1) vector of upper boundary limits for the same set of activities, invariant of scenarios; W and Y are, respectively, (NR×1) vectors of "slack variables" and "artificial variables" that transform risk-limiting inequalities into equations under S scenarios; and F is an (1×NR) vector of fines f[q] (q=n−R+1, . . . , n) that are imposed on the excessive portions y[q][H] of outcomes that exceed the boundary limits bl[q] (q=n−R+1, . . . , n). Equations (4.2) are NR risk-limiting inequalities transformed into equalities by adding slack variables W and subtracting artificial variables Y, while (4.3), (4.4) and (4.5) are the non-negativity conditions for variables XR, W and Y. The NK-dimensional vector XK (where XK is a subset of the set X) represents the values of K strategic variables under S scenarios, and equations (4.6) provide for the values of the K key variables being within close proximity of each other under all S scenarios H of the MSLP model (4). Variables XKP and XKM characterize the "intersubmodel" differences between the values of strategic variables. Inequalities (4.7) and (4.8) provide for, on the one hand, the non-negativity of these variables and, on the other hand, the allowed upper bounds (UB) on their values. These bounds may differ between strategic variables, but are assumed here to be invariant of both of these variables and scenarios.

Figure 4:
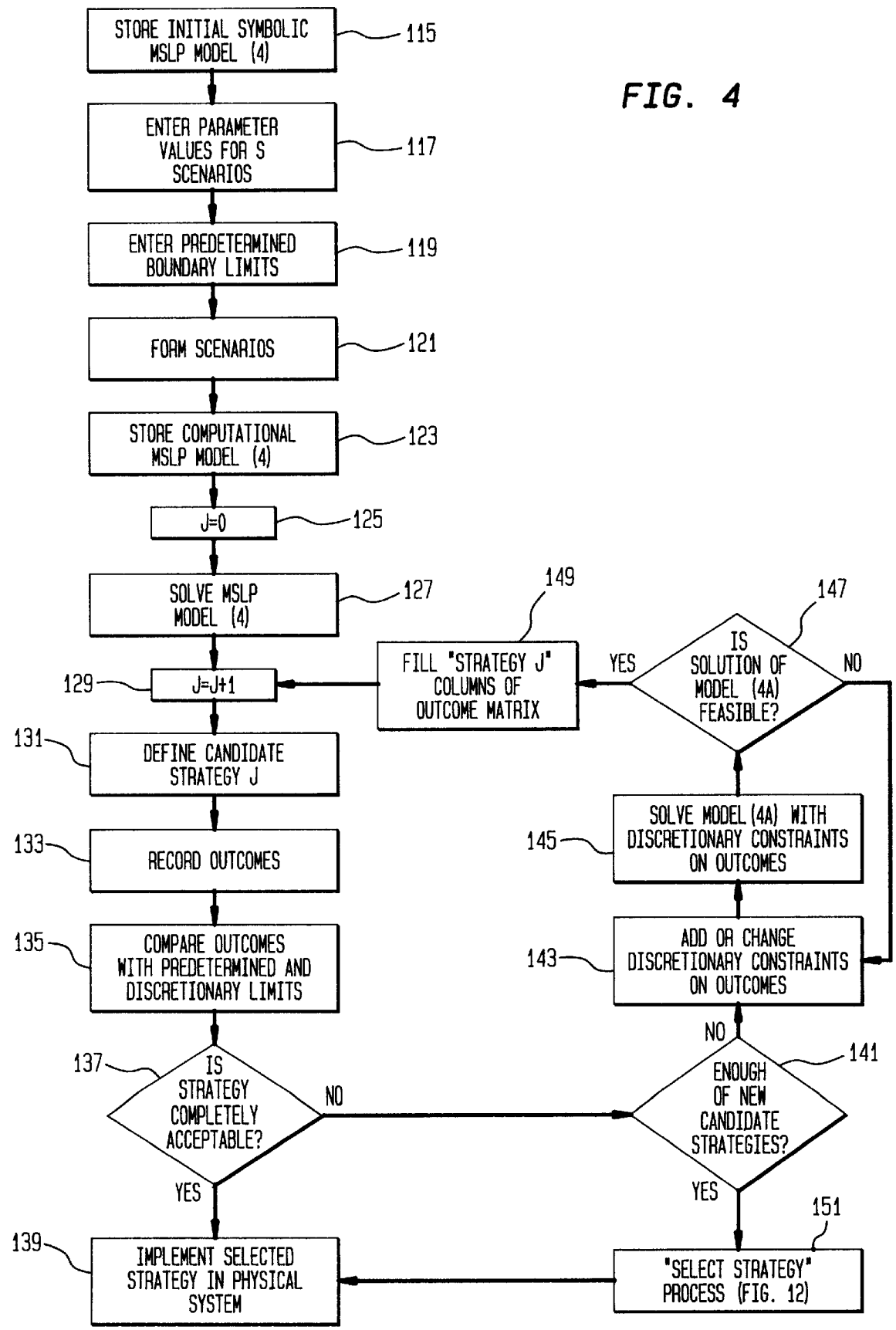
FIG. 4 is a flow chart of a computer method, in accordance with the invention, for managing risk under uncertainty, using a single multiscenario LP model.

FIG. 4 is a flow chart of a method, in accordance with the invention, for using MSLP to form strategies. The method begins with step 115, which stores an initial symbolic MSLP model (4) in computer memory. It continues with step 117, which enters parameter values for S scenarios. Next comes step 119, in which predetermined boundary limits are entered into memory, and step 121, in which scenarios are formed. Following that comes step 123, which stores in memory a computational MSLP model (4), and step 125, which sets J equal to zero. In step 127, the MSLP model is solved, after which J is incremented by 1 in step 129.

After step 129 comes step 131, which defines candidate strategy J, and step 133, which records outcomes in computer memory. From there, the method moves to step 135, which compares outcomes with any predetermined and discretionary boundary limits, and decision point 137, which determines whether or not the strategy is completely acceptable. If the answer is yes, the method moves directly to final step 139, in which the selected strategy is implemented in the physical system or systems. If the answer is no, the method moves to decision point 141, which determines whether or not a sufficient number of new candidate strategies has been selected. If the answer is yes, the method moves to step 151, which is the strategy selection process which will be described later and illustrated in FIG. 12. If the answer is no, the method moves to step 143, which adds or changes discretionary constraints on outcomes, and from there to step 145, which solves the expanded model (4A) with discretionary constraints on outcomes.

Following step 145, the method moves to decision point 147, which tests the feasibility of the model solution. If the answer is no, the method returns to step 143. If the answer is yes, the method moves to step 149, which fills "strategy J" columns of an outcome matrix, and then back to step 129.

The method of using MSLP for formation of strategies can be easily followed on the flow chart of FIG. 4. After forming initial symbolic model (4), entering the values of parameters, and predetermined boundary limits, forming scenarios, and forming and storing the computational MSLP model (4) in steps 115, 117, 119, 121, and 123, DMs:

solve the MSLP model (4) by any appropriate computer LP system—step 127;

define the vector of values of key variables in the optimal solution of (4) as Strategy J—step 131;

record in the computer memory the values of outcomes, defined as O[H][J][r] (H=1, . . . , S; r 1, . . . , R), obtained in the optimal solution of Strategy J in submodels H of (4) for each of R risk-related activities r—step 133;

compare, for each (H, r) pair (H=1, . . . , S; r=1, . . . , R), O[H][J][r] with references, targets and predetermined or discretionary limits, and deciding whether the obtained set of O[H][J][r] is fully acceptable for all H and r—step 135;

if this set of O[H][J][r], under all H and r (H=1, . . . , S; r=1, . . . , R), is both fully acceptable and superior to any other known strategy, the method stops the further development of candidate strategies and goes to implementation of strategy J—step 139;

otherwise, DMs consider whether they have enough candidate strategies for their selection of a strategy—decision point 141;

if they have, go to the "select strategy" process (see FIG. 12, which will be described later) and to strategy implementation—step 151;

otherwise, transform in the computer memory the MSLP model (4) into model (4A), appending to it discretionary risk-limiting constraints and other modifications that restrict all values of O[H][J][r] to acceptable discretionary limits imposed for individual scenarios and activities, or modifying such already existing constraints, to obtain a new strategy (J+1) with different outcomes O[H][J+1][r]—step 143;

solve the MSLP model (4A) with discretionary risk-limiting constraints on the outcomes of risk-related activities by any appropriate computer LP system—step 145;

check whether the resulting solution of MSLP (4A) with discretionary constraints generates a feasible candidate strategy—decision point 147; and if it does, fill the "Strategy J" columns of all two-dimensional "scenario vs. strategy" S×NST submatrices r (r=1, . . . , R) of OM with O[H][J][r] and proceed to constructing strategy (J+1)—step 149;

otherwise, return to adding or changing discretionary constraints on outcomes—step 143.

In spite of new, efficient approaches to dealing with complexity of decision-making that are incorporated in this invention, the number of scenarios or strategies still may turn out to be too large for solving the problem with available computer resources in the required time. In that case, each of these numbers can be reduced by grouping. There are two major forms of such grouping. One is "clustering," a well-known technique for grouping similar objects. The second is using the existing and known functional or statistical relationships between objects.

Every method of clustering has its drawbacks. Using any specific method may lead to allocation of objects to the wrong clusters. In usual applications of clustering, such errors are difficult to find and eliminate. This invention is different: although it may perfectly well deal with object groups, it is especially interested in the "worst" scenarios and strategies. Therefore both objects with ambiguous cluster allocation and the worst objects of clusters can be separated and treated as individual entities—either from the very beginning or upon obtaining computational results. At some stages of the method, clusters or other groups that deserve special attention can be completely "unclustered," and later clustered again, in old or new combinations.

Figure 5:
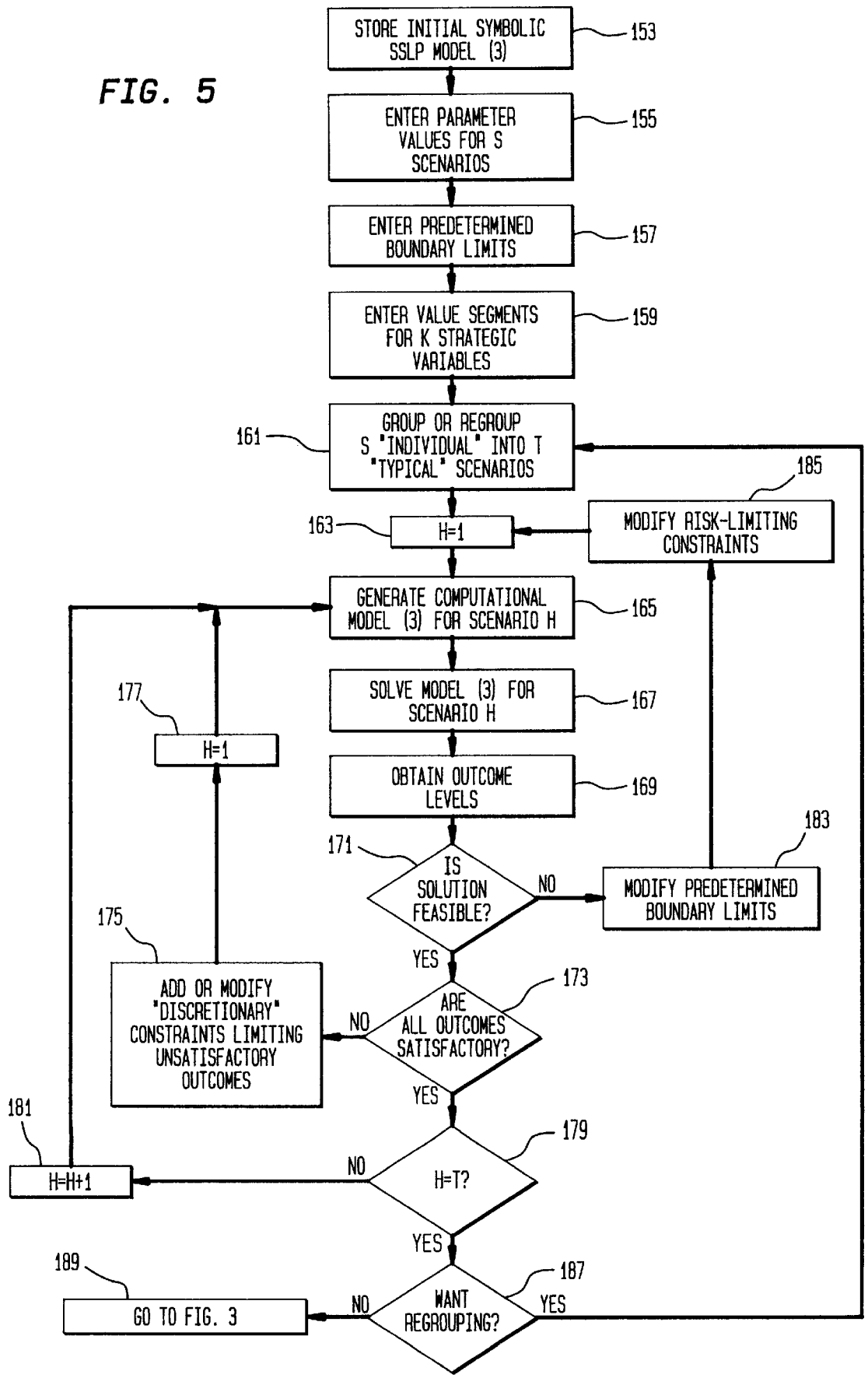
FIG. 5 is a flow chart of a computer method, in accordance with the invention, for managing risk under uncertainty, using single-scenario LP models jointly with clustering individual scenarios into typical scenarios.

In FIG. 5, the method begins with step 153, in which an initial symbolic SSLP model (3) is stored in computer memory. Next comes step 155, in which parameter values for S scenarios are entered, and then step 157, in which predetermined boundary limits are entered. Then, step 159 enters value segments for K strategic variables, and step 161 groups or regroups S individual scenarios into T typical scenarios. From there, step 163 sets H equal to 1.

Next in FIG. 5 comes step 165, which generates in computer memory a computational model for scenario H. From there, step 167 solves the computational model for scenario H and step 169 obtains and records outcome levels in memory. Following step 169 comes decision point 171, which determines whether or not the recorded solution is feasible. If the answer is yes, decision point 173 determines whether all outcomes are satisfactory. If the answer is no, the method moves to step 175, which adds or modifies discretionary constraints limiting unsatisfactory outcomes, to step 177, which sets H equal to 1, and back to step 165 for further computational model generation.

If the answer at decision point 173 in FIG. 5 is yes, the method moves to decision point 179, which determines whether or not H is equal to T. If the answer is no, the method moves to step 181, which increments H by 1 and returns to computational model generation step 165. If the answer at decision point 171 is no, the method moves to step 183, which modifies at least one of the predetermined boundary limits, to step 185, which modifies the risk-limiting constraints, and back to step 163, which sets H to 1. Finally, if the answer at decision point 179 is yes, the method moves to decision point 187, which determines whether regrouping is desired. If the answer is yes, the method returns to step 161. If the answer is no, the method goes to step 189, which returns to step 75 in FIG. 3.

The method for finding the solution for a physical system under uncertainty via the use of SSLP models with clustering can easily be followed on the flow chart of FIG. 5. It can be seen that the flow chart in FIG. 5 is almost identical to the flow chart in FIG. 2. The exception is that the "FORM S SCENARIOS" stage is replaced by the "GROUP OR REGROUP 'INDIVIDUAL' INTO 'TYPICAL' SCENARIOS" (step 161), so that one method loop returns to that operation.

Another approach to solving decision-making problems where the number of scenarios is too large to cover with a single MSLP model (4) is by solving many MSLP models (4) of smaller size. Let the total number of scenarios equal S and let the largest MSLP model (4) that can be solved in acceptable time have WS scenarios. For simplicity, let also NUMS=S/WS be an integer. The method of solving the problem by this technique can be followed easily on the flow chart of FIG. 6.

Figure 6:
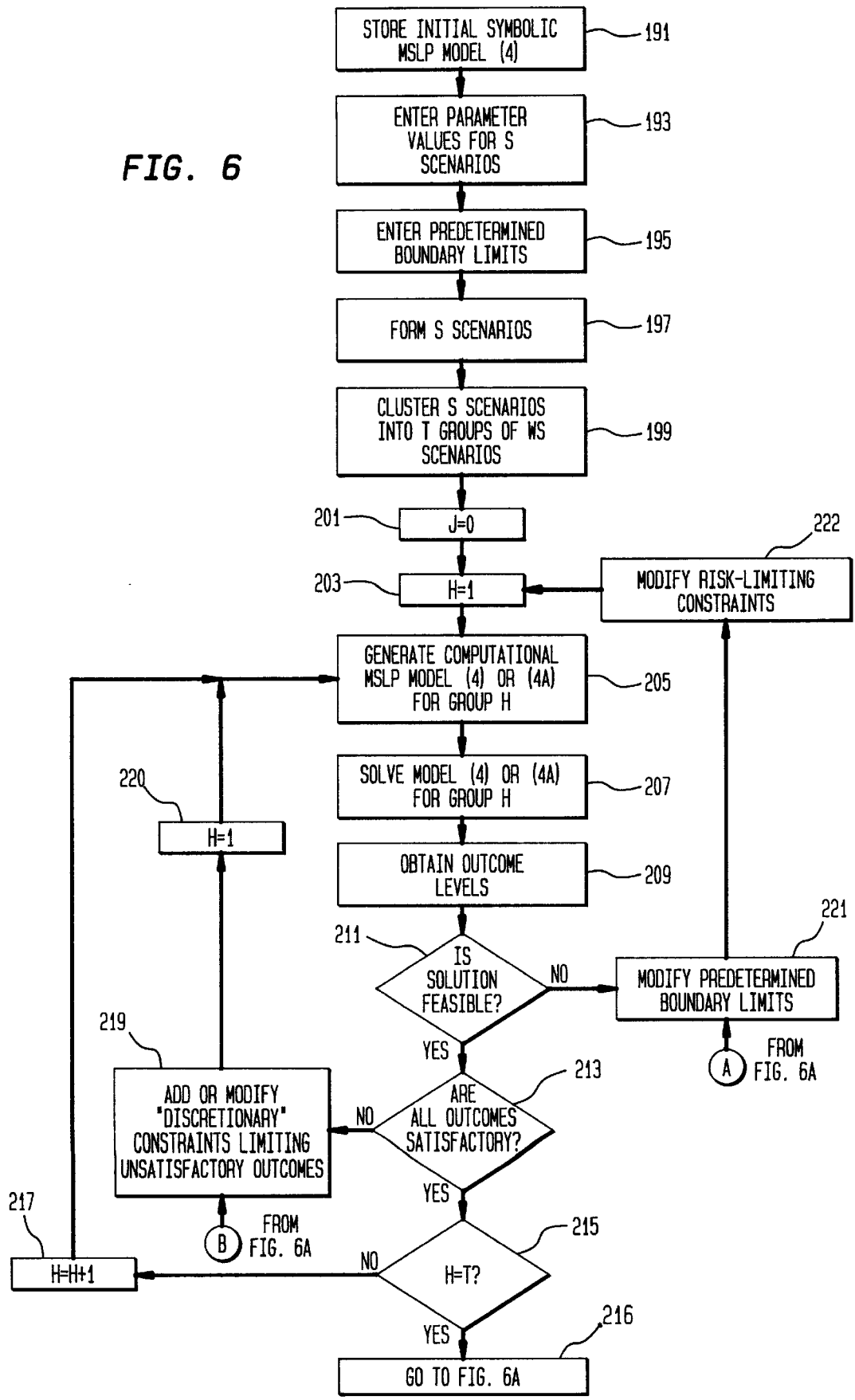
FIG. 6 is a flow chart of a computer method, in accordance with the invention, for managing risk under uncertainty with the use of multiple multiscenario LP models.

In FIG. 6, the method begins with step 191, in which an initial symbolic MSLP model (4) is stored in computer memory. Next, the method moves through step 193, in which parameter values for S scenarios are entered into memory, step 195, in which predetermined boundary limits are entered into memory, and step 197, in which S scenarios are formed. Next, step 199 clusters S scenarios into T groups of WS scenarios. From there, step 201 sets J equal to zero, where J is as defined heretofore.

From step 201 in FIG. 6, the method moves to step 203, setting H equal to 1, where H is an index of the scenario group being tested, and to step 205, which generates a computational MSLP model (4) or (4A) for group H. After step 205 comes step 207, which solves the model (4) or (4A) for group H, and step 209, which obtains and records outcome levels. After step 209 comes decision point 211, which determines whether or not the solution is feasible. If the answer is yes, the method moves to decision point 213, which determines whether all outcomes are satisfactory. If the answer there is yes, the method moves to decision point 215, which determines whether or not H is equal to T. If the answer at decision point 215 is no, the method moves to step 217, which increments H by 1, and proceeds back to model generation step 205. If the answer at decision point 211 is no, the method moves to step 221 to modify the predetermined boundary limits and to step 222 to modify the risk-limiting constraints before returning to step 203, setting H equal to 1. If the answer at decision point 213 is no, the method goes to step 219, to add or modify "discretionary" constraints limiting unsatisfactory outcomes, to step 220, setting H equal to 1, and back to step 205.

Figure 6A:
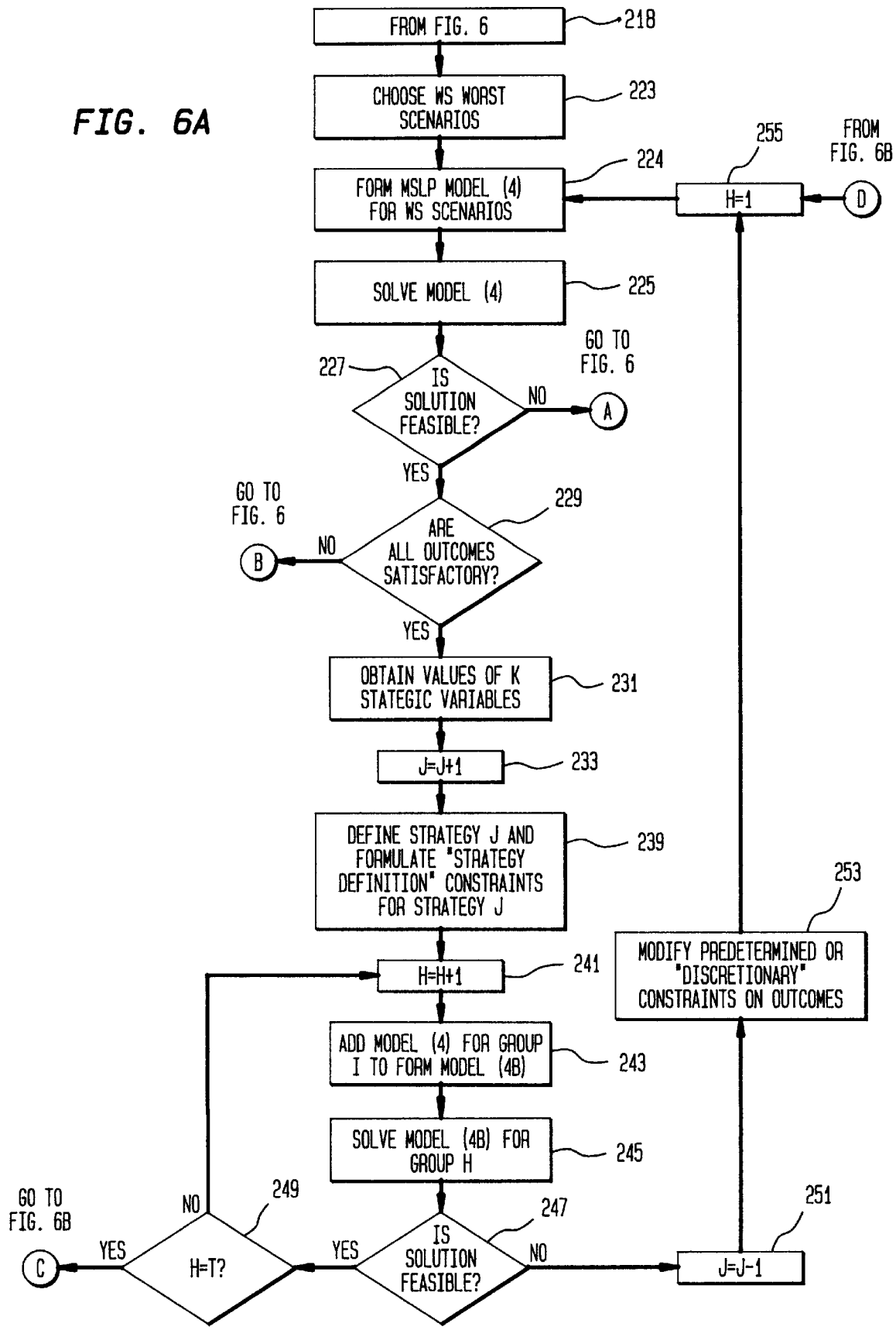
FIG. 6A an extension of the flow chart in FIG. 6.

In FIG. 6, if the answer at decision point 215 is yes, the method moves through step 216 to FIG. 6A, which begins with step 218 and moves to step 223, choosing the WS worst scenarios. Also necessary for completion of the method illustrated in FIG. 6 are point A, which comes from step 227 in FIG. 6A and point B, which comes from step 229 in FIG. 6A.

From FIG. 6, a yes answer at decision point 215 connects to step 223 in FIG. 6A, in which the WS worst scenarios are selected. From there in FIG. 6A, the method moves to step 224, forming an MSLP model (4) for WS scenarios. Next, step 225 solves the model and moves to decision point 227 to determine whether or not the solution is feasible. If the answer is no, the method moves to point A and back to step 221 in FIG. 6. If the answer is yes, the method moves to decision point 229 to determine whether or not all outcomes are satisfactory. If the answer is no, the method moves to point B and back to step 219 in FIG. 6. If the answer is yes, the method moves to step 231 to obtain the values of K strategic variables.

From step 231, the method in FIG. 6A moves to step 233, where J is incremented by one. From there, it moves to step 239 to define strategy J and formulate "strategy definition" constraints for strategy J. From step 239, the method moves to step 241, where H is incremented by 1, to step 243, where a model (4) for group H is added to the strategy definition constraints for strategy J, and to step 245, where the model (4B) for group H is solved. From step 245, the method moves to decision point 247 to test whether or not the solution is feasible. If the answer is yes, the method moves to decision point 249 to determine whether or not H is equal to T. If the answer at decision point 249 is yes, the method moves to point C and thence to FIG. 6B in a manner which will be described later. If the answer at decision point 249 is no, the method moves back to step 241 in FIG. 6A.

If the answer at decision point 247 is no, the method in FIG. 6A moves to step 251, where J is decremented by 1. From step 251, the method moves to step 253, which modifies predetermined or "discretionary" restraints on outcomes, and to step 255, which sets H equal to 1. From step 255, the method moves back to step 224, to form an expanded MSLP model for WS scenarios.

Figure 6B:
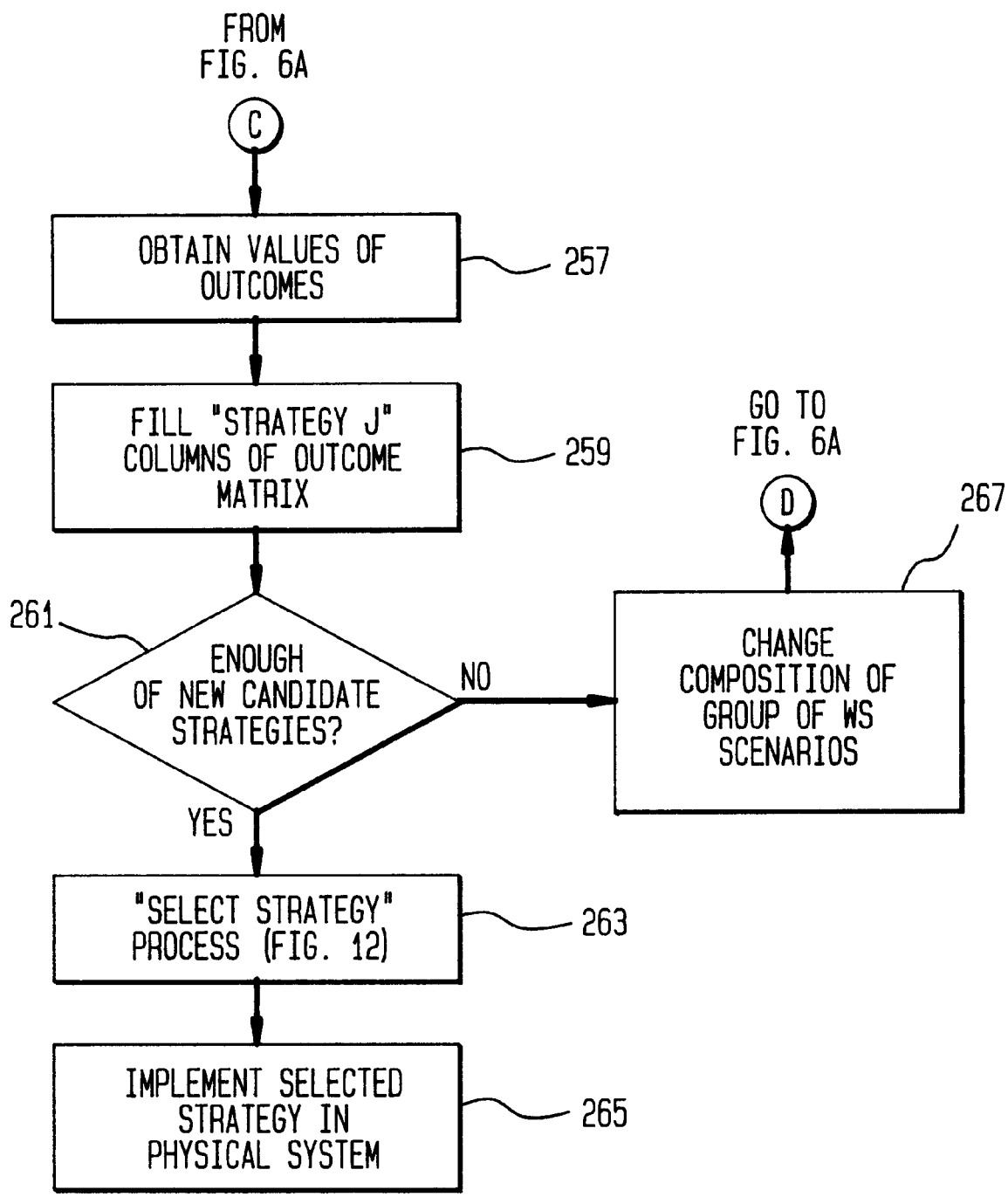
FIG. 6B is another extension of the flow chart in FIG. 6.

In FIG. 6B, step 257 is driven from point C, which comes from a yes answer at decision point 249 in FIG. 6A. After step 257, step 259 fills the "Strategy J" columns of an outcome matrix. From there, the method moves to decision point 261 to determine whether or not to call a halt to the generation of new candidate strategies. A yes answer leads to step 263, which is the "select strategy" process yet to be described in connection with FIG. 12. Following step 263, the method comes to an end with step 265, which implements the selected strategy in the physical system or systems.

A no answer at decision point 261 in FIG. 6B causes the method to move to step 267, which changes the composition of the group of WS scenarios. From there, the method moves to point D, which goes to step 255 in FIG. 6A.

Similarly to the method above that uses an SSLP model (3), the method currently being described consists of three parts. First, it clusters S scenarios into NUMS groups of WS scenarios each, forms model (4) for each group, finds a solution of that model (4) that is both feasible and acceptable, and obtains and records the values of outcomes of all risk-related activities. Second, the method selects a group of WS scenarios that are the worst in some outcomes, and repeats the above procedure for that "worst group"— that is, forms model (4) for the group, finds a solution of that model (4) that is both feasible and acceptable, and obtains and records the values of outcomes of all risk-related activities. The method also obtains the values of strategic variables in the solution of model (4) and defines the corresponding candidate strategy. Finally, the method adjusts the candidate strategy to diverse conditions of NUMS scenario groups (that is, of all S scenarios) and records the outcomes in the format of an outcome matrix. This process can be repeated to form as many candidate strategies as desired, starting from different scenario groups and different discretionary constraints.

In the first part, as illustrated in FIG. 6, after forming the initial symbolic model (4), entering the values of parameters, predetermined boundary limits, and value segments for strategic variables, DMs:

form S scenarios—step 197;

split S scenarios into T groups, each comprised of WS scenarios—step 199;

for each of these groups, in turn, generate and store computational MSLP model (4) and solve model (4) by any appropriate computer LP system—steps 205 and 207;

if any of T solutions of computational MSLP models (4) is infeasible, modify the values of predetermined boundary limits and the corresponding risk-limiting constraints, and solve all T models (4) again—steps 211, 221, 222, 205, and 207;

obtain and record the values of outcomes—step 209; and if, for some scenarios and some activities, the outcomes are not considered satisfactory, impose or modify (for the scenario groups and activities involved) additional "discretionary" risk-limiting constraints and solve computational models (4A) again for the relevant scenario groups—steps 219, 220, 205, and 207.

In the second part, as illustrated in FIGS. 6 and 6A, when all outcomes for all scenario groups are satisfactory, DMs:

form a new scenario group from WS scenarios where the outcomes are the worst, form an MSLP model (4) for that group and solve the model by any appropriate computer LP system 1—steps 223, 224, and 225;

again, check whether the solution is feasible and, if not, modify the predetermined limits—steps 227, 221, and 222;

if desirable, modify the discretionary constraints and obtain both feasible and satisfactory solution—steps 229, 219, 205, and 207;

obtain and record the values of outcomes, including the values of strategic variables—steps 209 and 231; and formulate "strategy definition" constraints—step 239.

In this part of the method, screening out of bad solutions is accomplished by a combination of three types of constraints: constraints based upon predetermined boundary limits, discretionary constraints, and "strategy definition" constraints that limit the values of strategic variables.

In the third part, model (4) for each of T groups of WS scenarios is, in turn, added to "strategy definition" constraints to form model (4B) for that group. Computational models (4B) are solved in turn for all T groups. The values of outcomes in risk-related activities for all S scenarios are obtained from these solutions and fill the columns for the current strategy in the outcome matrix. The method starts a new candidate strategy by changing either the discretionary constraints or the "worst scenario" group.

As indicated above, this method is a complex part of the invention, but it is also the best for dealing with very large and complicated problems. Even if the size of a problem is so large that no more than two scenarios can be put into an MSLP, its capacity to find compromise solutions, along with its ability to form many combinations of scenarios, permits a sharp improvement in the quality of strategies.

This concludes the section of the "Detailed Description" about aspects of the invention related to formulating and solving LP models in constructing candidate strategies. The next part refers to methods of selecting a strategy to be implemented in the physical system.

Most state-of-the-art methods of selecting a strategy on the basis of a payoff (outcome) matrix are described in the previously quoted "Games and Solutions," Chapter 13. This invention offers three new methods described below. State-of-the-art computer methods refer to two-dimensional payoff matrices that contain "strategy versus scenario" outcomes. Two-dimensional matrices are sufficient if there is only one risk-related activity, such as the financial results of a project.

FIG. 7 demonstrates such a two-dimensional payoff matrix for a four-strategy, six-scenario problem. The single risk-related activity is here the cost of a supply chain production and distribution plan, which is developed by using MSLP models (4) and (4A) in a real world problem. The matrix entries are the costs of the strategy under different "strategy versus scenario" combinations (in dollars).

In addition to the true payoff matrix shown in the first six lines and four columns of cost numbers, FIG. 7 contains four aggregate cost results (BEST COST, WORST COST, EXPECTED COST, and EXPECTED IR COST) for each strategy, and one aggregate (BEST SCENARIO COST) for each scenario. IR stands here for "insufficient reason"; this term is explained below. EXPECTED COST is computed by Eq. (5) and EXPECTED IR COST by Eq. (6):

$$\text{EXPECTED COST } (J) = \sum_{H=1}^{S} u[H]O[H][J]; \tag{5}$$

$$\text{EXPECTED } IR \text{ COST } (J) = \left(\sum_{H=1}^{S} O[H][J]\right)/S; \tag{6}$$

where O[H][J] is the cost payoff for strategy J under scenario H, u[H] is the probability of scenario H, and S is the number of scenarios.

In payoff-based criteria, four strategy cost results are used for comparing the strategies, screening out the worst strategies, and, finally, selecting the best one. The best scenario results are used for computing the regret matrix.

For any "strategy versus scenario" combination, regret is computed by Eq. (7):

$$REGRET[H][J]=BEST[H]-O[H][J], \quad (7)$$

where: BEST(H) is the BEST SCENARIO COST for scenario H and O[H][J] is the payoff for strategy J under scenario H.

For payoffs of FIG. 7, the regret matrix is shown in FIG. 8. In each scenario row, at least one entry (for the strategy that is the best under that scenario) equals zero. For any other strategy, REGRET is the amount of opportunity lost because the strategy, if selected, turns out not to be the best under scenario H. Again, in addition to the true regret matrix in the first six lines and four columns of regret numbers, FIG. 8 contains four aggregate regret results for each strategy. EXPECTED REGRET is computed by Eq. (8) and EXPECTED IR REGRET by Eq. (9):

$$\text{EXPECTED REGRET } (J) = \sum_{H=1}^{S} u[H]REGRET[H][J]; \quad (8)$$

$$\text{EXPECTED IR REGRET } (J) = \left(\sum_{H=1}^{S} REGRET[H][J]\right)/S \quad (9)$$

where REGRET[H][J] is regret for strategy J under scenario H, u[H] is the probability of scenario H, and S is the number of scenarios.

Three new regret-based methods to be introduced in this invention are:

(a) OPR—The Optimism-Pessimism Index (Regret) Criterion;

(b) PIR—The Partial Ignorance (Regret) Criterion;

(c) MIRR—The Modified Insufficient Reason (Regret) Criterion.

The previously known payoff-based counterparts for these methods are:

For OPR—OP, or The Optimism-Pessimism Index Criterion;

For PIR—PI, or The Partial Ignorance Criterion;

For MIRR—MIR, or The Modified Insufficient Reason Criterion.

For all three methods and their known counterparts, the general methodology has many common points. It is as follows.

If decision-makers (DMs) are very pessimistic, they can compare the strategies just on the basis of their worst results, which are WORST COST for the payoff methods and WORST REGRET for the regret methods. This corresponds to previously known "minimax payoff" and "minimax regret" criteria, respectively. In other words, DMs choose the strategy that has the best WORST and thus try to protect themselves against disastrous outcomes.

If DMs are very optimistic, they can compare the strategies just on the basis of their best results, which are BEST COST for the payoff methods and BEST REGRET for the regret methods. This corresponds to previously known "maximax payoff" or "maximax regret" criteria, respectively. In other words, DMs choose the strategy that has the best BEST.

Decision Science offers the previously known synthetic OP ("optimism-pessimism index") criterion to retain the flexibility of DMs' and their ability to change the selection criteria at will, depending on their judgment of the conditions of a specific problem. The OP criterion is applicable to payoffs only. The corresponding new method of this invention, OPR, is applicable to regrets only.

Both criteria consider as unreliable any information on scenario probabilities, and therefore compare strategies J only on the basis of BEST (COST or REGRET, respectively), WORST (COST or REGRET, respectively), and an "optimism-pessimism index" ALPHA. ALPHA incorporates both objective knowledge, including the existing forecasts, and subjective judgment of DMs.

The first new method involves the OPR criterion, which is:

Select J that minimizes ZOPR(J, ALPHA)=(1−ALPHA) *BEST REGRET(J)+ALPHA*WORST REGRET(J), 0≦ALPHA≦1 (J=1, . . . , NST),+tm (10)

where the value of ALPHA is specified by the user and NST is the number of strategies. ZOPR(ALPHA) is here the expected regret for strategy J if probability ALPHA is assigned to the scenario that is the worst for J, probability (1−ALPHA) to the best scenario, and zero probabilities to all other scenarios. The previously known OP criterion is similar, with ZOPR replaced by ZOP and REGRET replaced by COST.

The extreme value of ALPHA=1 corresponds to the pessimistic outlook of minimax regret, while ALPHA=0 corresponds to the optimistic outlook of maximax. Since an arbitrary choice of a specific value of ALPHA does not inspire confidence, a set of different values of ALPHA can be used. The values of ZOPR(J, ALPHA) under varying values of ALPHA, as they are described by (10), can be represented by a straight-line segment on the (0,1) interval; see FIG. 9.

Figure 9:
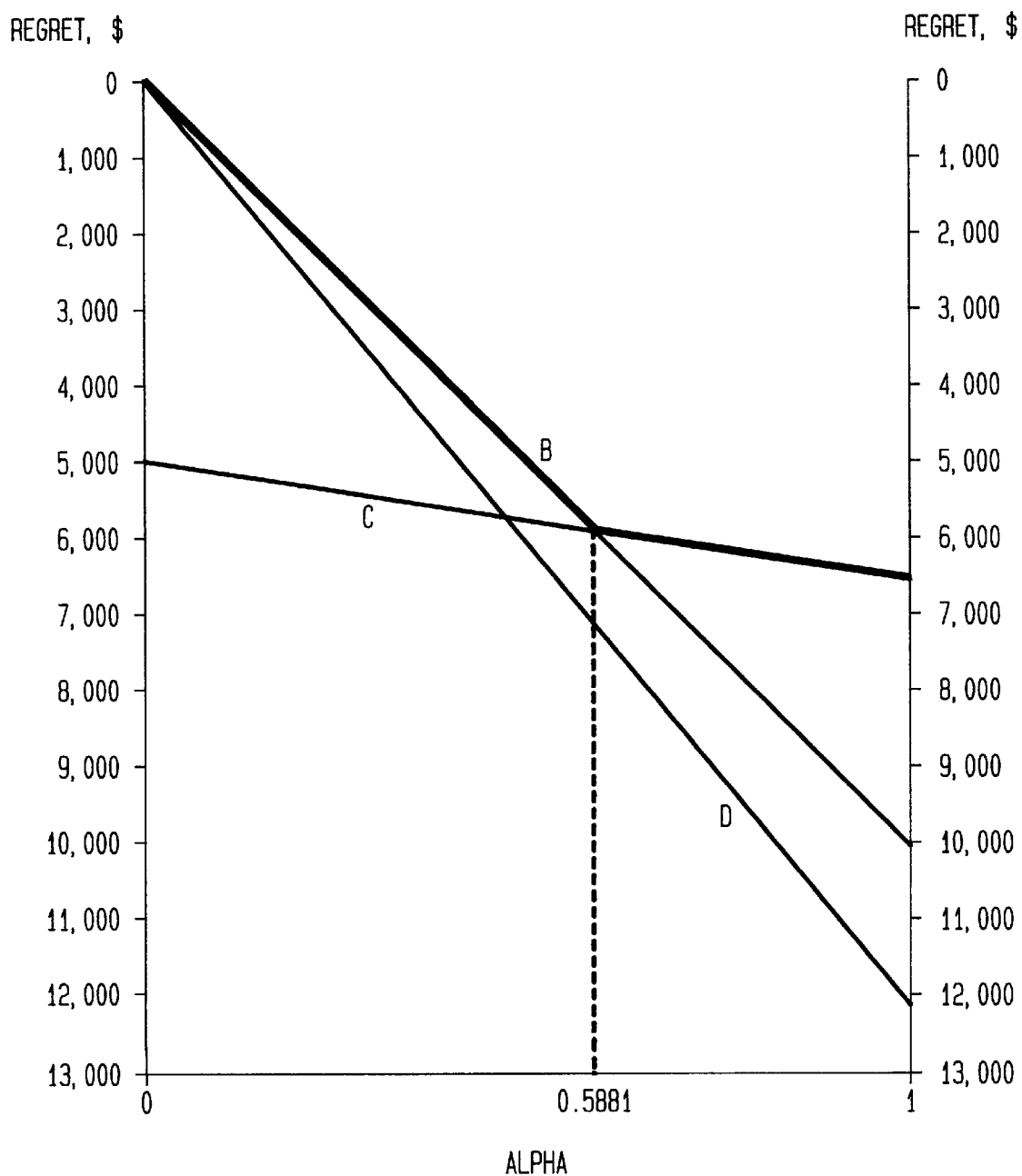
FIG. 9 is a decision graph (OPR efficient frontier) for the OPR method of comparing the candidate strategies.

FIG. 9 is a decision graph illustrating the optimism-pessimism index (regret) for strategies B, C, and D using the OPR criterion. The ordinate is regret, measured in dollars, and the abscissa is ALPHA, measured from zero to unity. Strategy A is omitted, since it is obviously much worse. In FIG. 9, the ZOPR line for strategy B is:

ZOPR(B, ALPHA)=(1−ALPHA)*0+ALPHA*10,008.

The ZOPR line for strategy C is:

ZOPR(C, ALPHA)=(1−ALPHA)*4,950+ALPHA*6,541.

These two lines intersect at the value of ALPHA where the ZOPRs for both strategies are equal, or at ALPHA=0.5881. This means that if DMs consider the probability of the best scenarios (which, for both strategy B and strategy C, happen to be scenarios 1 and 5) as less than 0.5881, they should select strategy B because it has, up to that value of ALPHA, smaller values of ZOPR. On the other hand, if they are pessimistic and consider ALPHA closer to 1, they should select strategy C.

FIG. 9 presents the "OPR efficient frontier" for this example. The efficient frontier is the set of best strategies on the [0, 1] range. It comprises two bold straight-line segments: from (0, 0) to (0.5881, 5,886) and from (0.5881, 5,886) to (1.0, 6,541). Each strategy on the efficient frontier is characterized by a subinterval of the [0, 1] range where this strategy is the optimal choice. The efficient frontier incorporates valuable information about the relative merits and demerits of any strategy:

The composition of the subset of strategies that form the efficient frontier.

The width of the subinterval supporting each optimal strategy.

The order of optimal strategies from the optimistic end of the [0, 1] interval to the pessimistic end.

The difference between the regrets for the best strategy and other strategies, which shows the possible impairment of results in choosing a non-optimal strategy.

The OPR efficient frontier consists of two strategies, B and C. The "optimistic part" of the [0, 1] interval, where strategy B is optimal, has a width of 0.5881, while strategy C is optimal on a 0.4119 subinterval. At ALPHA=0.5, the difference between the regrets of C and B equals 742, while at ALPHA=0.7 it equals −942.

The second new method involves the PIR criterion, very similar to the OPR criterion. The PIR criterion is, however, more cautious: while leaving intact the "pessimistic end"—that is, WORST REGRET(J)—of the straight-line segment that represents strategy J, it replaces the "optimistic end" by the EXPECTED REGRET[J]. The PIR criterion is:

Select J that minimizes $$\text{ZPIR}(J, \text{ALPHA})=(1-\text{ALPHA})*\text{EXPECTED REGRET},(J)+ \text{ALPHA}*\text{WORST REGRET}(J), \quad (11)$$

$0 \leq \text{ALPHA} \leq 1$ (J=1, ..., NST), where the value of ALPHA is again specified by the user. (The previously known PI criterion is similar, with ZPIR replaced by ZPI and REGRET replaced by COST.) The extreme value of ALPHA=1 again corresponds to the pessimistic outlook of minimax regret, while ALPHA=0 corresponds to a more optimistic outlook of expected regret. In other words, DMs do not want to be carried away by overly rosy expectations of potential BEST REGRET; they therefore lower their expectations and assume that the best they can hope for is EXPECTED REGRET. At the same time, the real regret can be much lower, down to WORST REGRET. The more reliable the forecast scenario probabilities, the closer DMs can move toward the simple expected regret criterion by decreasing the value of ALPHA. In contrast, the less DMs trust the information available, the more they should be inclined to be conservative. At ALPHA=1, the PIR method is again reduced to the pessimistic minimax regret criterion.

Figure 10:
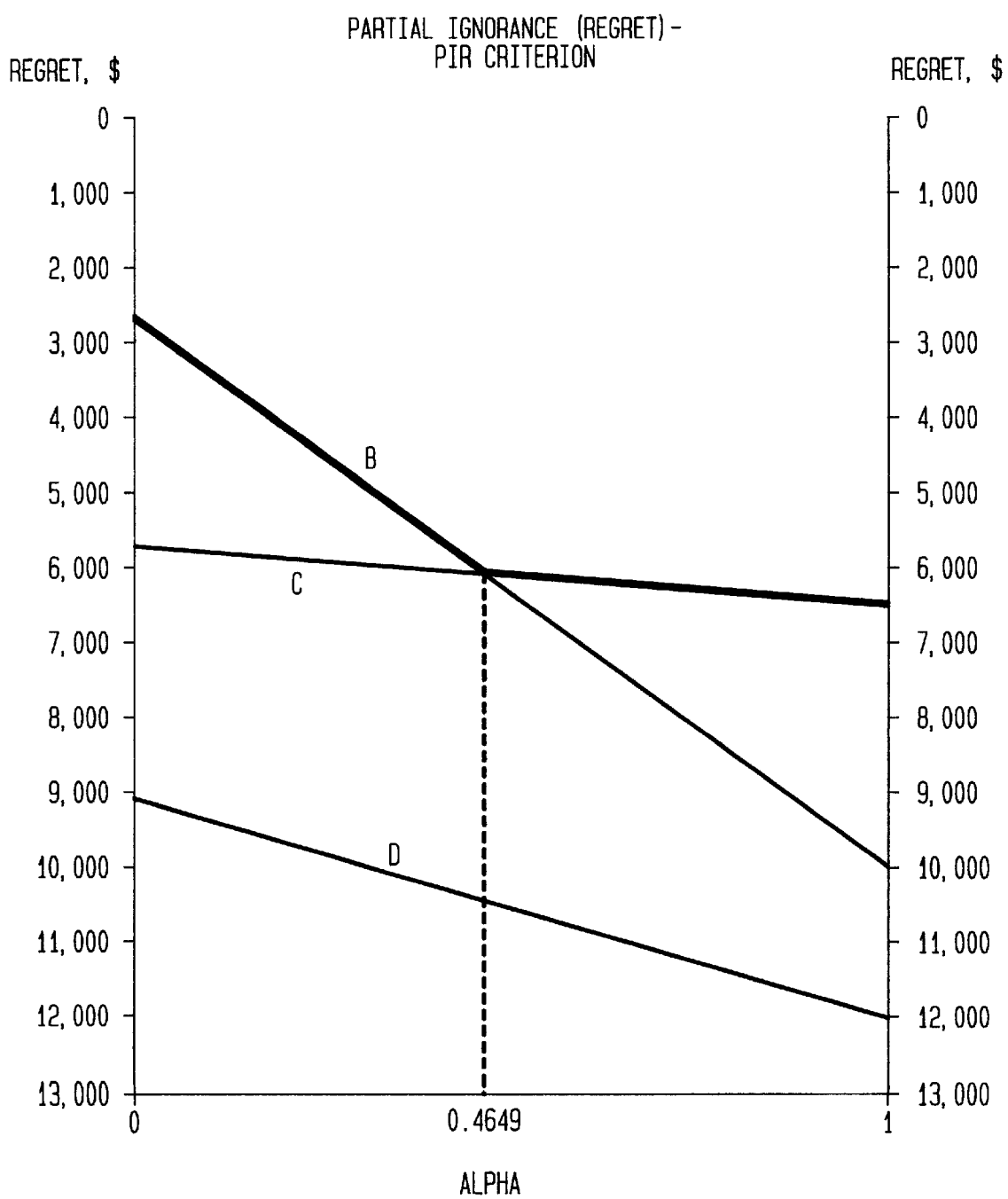
FIG. 10 is a decision graph (PIR efficient frontier) for the PIR method of comparing the candidate strategies.

The values of ZPIR(J, ALPHA) under varying values of ALPHA, as they are described by Eq.(11), can be represented by a straight-line segment on the (0,1) interval; see FIG. 10, which is a graph of PIR efficient frontier. FIG. 10 is a decision graph illustrating the partial ignorance index (regret) for strategies B, C, and D using the PIR criterion. The ordinate is regret, measured in dollars, and the abscissa is ALPHA, measured from zero to unity.

FIG. 10 also depicts only strategies B, C, and D. In FIG. 10, the ZPIR line for strategy B is:

$$\text{ZPIR}(B, \text{ALPHA})=(1-\text{ALPHA})*2,742+\text{ALPHA}*10,008.$$

The ZPIR line for strategy C is:

$$\text{ZPIR}(C, \text{ALPHA})=(1-\text{ALPHA})*5,754+\text{ALPHA}*6,541.$$

These two lines intersect at the value of ALPHA=0.4649 where ZPIRs for both strategies are equal. If the probability of the best scenarios is less than 0.4649, strategy B should be selected, otherwise—strategy C. Since the PIR criterion is more realistic than OPR, the area of an optimistic choice of a strategy becomes more narrow.

The third method involves the MIRR criterion used when the information on scenario probabilities is either absent or quite unreliable. In such cases, there is no sufficient reason to consider that the scenarios are not equally likely to occur, so the probability of each scenario is assumed to be 1/S, where S is the number of scenarios. With EXPECTED IR REGRET computed by Eq. (9), the MIRR criterion is quite similar to the PIR criterion. The MIRR criterion is:

Select J that minimizes $$\text{ZIRR}(J, \text{ALPHA})=(1-\text{ALPHA})*\text{EXPECTED IR REGRET}(J)+ \text{ALPHA}*\text{WORST REGRET}(J), \quad (12)$$

$0 \leq \text{ALPHA} \leq 1$ (J=1, ..., NST).

Figure 11:
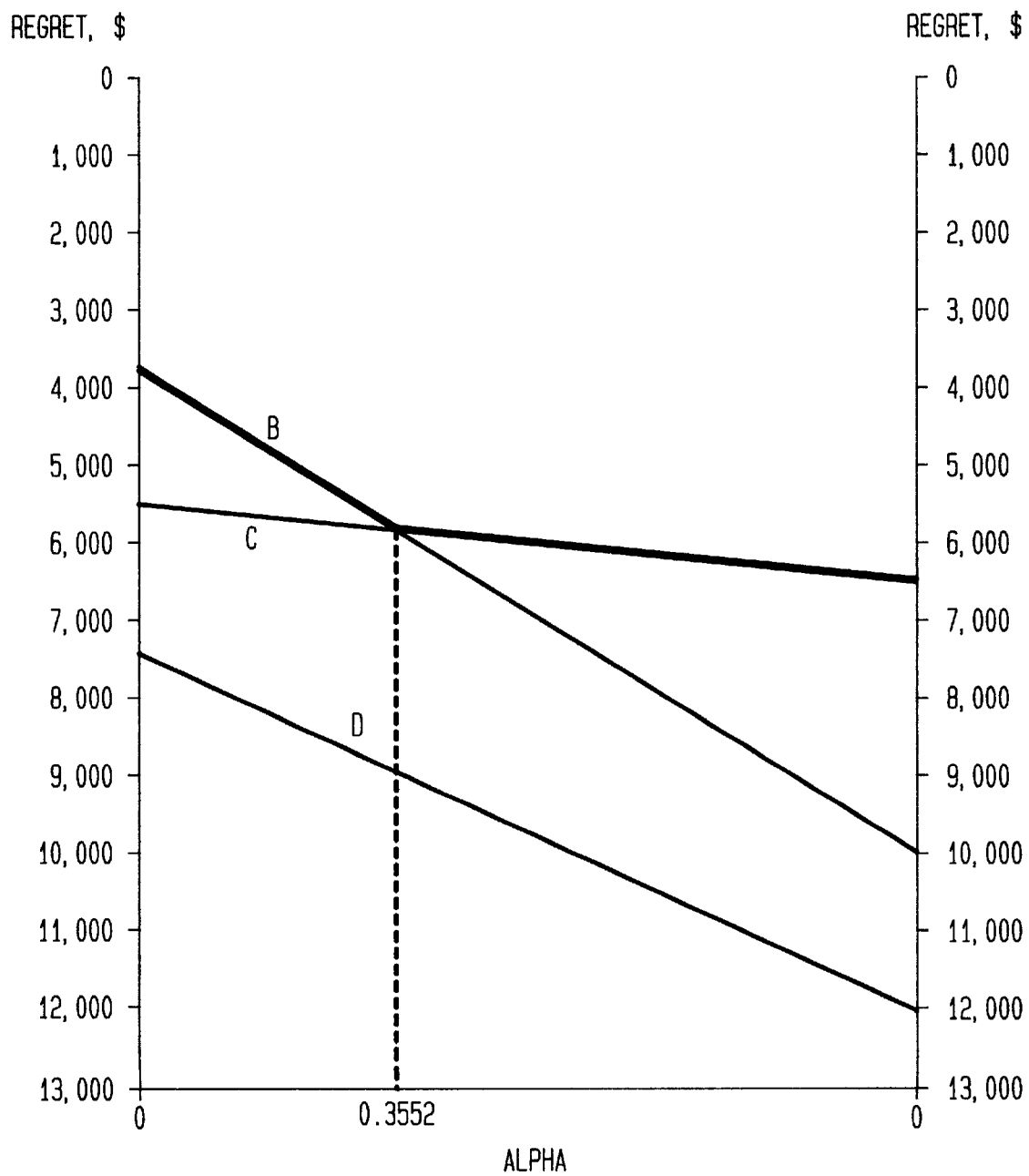
FIG. 11 is a decision graph (MIRR efficient frontier) for the MIRR method of comparing the candidate strategies.

The straight-line ZIRR segments based on Eq. (12) are shown in FIG. 11, which is a graph of MIRR efficient frontier. This time, the intersection of lines for strategy B and strategy C is at 0.3552. FIG. 11 is a decision graph illustrating modified insufficient reason (regret) for strategies B, C, and D using the MIRR criterion. The ordinate is regret, measured in dollars, and the abscissa is ALPHA, measured from zero to unity.

The three new regret-based methods of this invention allow much more sophisticated and sharp analysis in comparing and selecting strategies. This is demonstrated in the example depicted in FIGS. 7 through 11. The cost matrix in FIG. 7 has been generated in an attempt to reduce the riskiness of evolving candidate strategies—first strategy A, then B, then C. Strategy A is very risky. Compromise strategy B is generated by using model (4) and the corresponding multiscenario model. The next step is intended to reduce the high costs encountered under scenarios 2 and 4—even at the price of increasing costs under other scenarios. Imposing the needed discretionary constraints achieves that goal and obtains strategy C. Repeating this procedure with tighter discretionary constraints further reduces the costs under the two worst scenarios. It therefore seems that strategy D is less risky than strategy C, which in turn is less risky than strategy B. The cost results more or less confirm that impression: in moving from strategy C to strategy D, worst costs decrease by 5,268, while the expected costs rise only 3,347 (see FIG. 7).

Analysis of the regret results and of the regret-based efficient frontiers of FIGS. 9 through 11, however, brings one to a completely different conclusion. The regret outcomes for strategy D under scenarios 2 and 4 indeed become the best. However, the price paid is too steep: regrets under the other four scenarios exceed 10,400 and under two of them come to around 12,000. Correspondingly, as can be seen, for instance, in FIG. 10, strategy D is much worse than either strategy B or strategy C. Such incisive analysis is not possible when only previously known DS methods are used. The regret-based criteria are therefore invaluable in determining desirable limits on tightening discretionary constraints.

To simplify and possibly improve the use of outcome and regret matrices in decision-making, the following difficulties (in addition to introducing new and improved DS criteria) have to be overcome:

First, if, in addition to the outcomes of a first risk-related activity, such as cost, the problem has to deal with the outcomes of a second risk-related activity, such as the output of a dangerous by-product, a second two-dimensional outcome matrix results. The method thus generates a three-dimensional array of two matrices. The outcome matrix may also have more than three dimensions—for instance, if the outcomes are classified by the causes of uncertainty.

These multidimensional matrices have to be transformed into two-dimensional ones where the state-of-the-art methods of Decision Science can be applied.

Second, decisions are often made not by a single decision-maker, but by a group whose members may have different priorities and criteria for selecting a strategy.

Third, some tables of the outcome matrix may be filled in not with numerical values, but rather with qualitative characteristics such as "good" or "convenient."

Fourth, there are several state-of-the-art and new criteria of Decision Science for selecting a strategy. They may give conflicting answers.

This invention provides techniques for dealing with all these and similar difficulties. The key is in weighting the matrix entries. For instance, in converting a three-dimensional matrix into a two-dimensional one, one risk-related activity, such as the financial results, is given priority as the main activity. The outcomes in all other risk-related activities are converted into the additional outcomes of the main activity by multiplying them by conversion coefficients, or weights. The values of these coefficients are not likely to be known with accuracy. Consequently, several different values are used simultaneously for each conversion coefficient, so the number of scenarios considered in the matrix increases proportionately.

Figure 12:
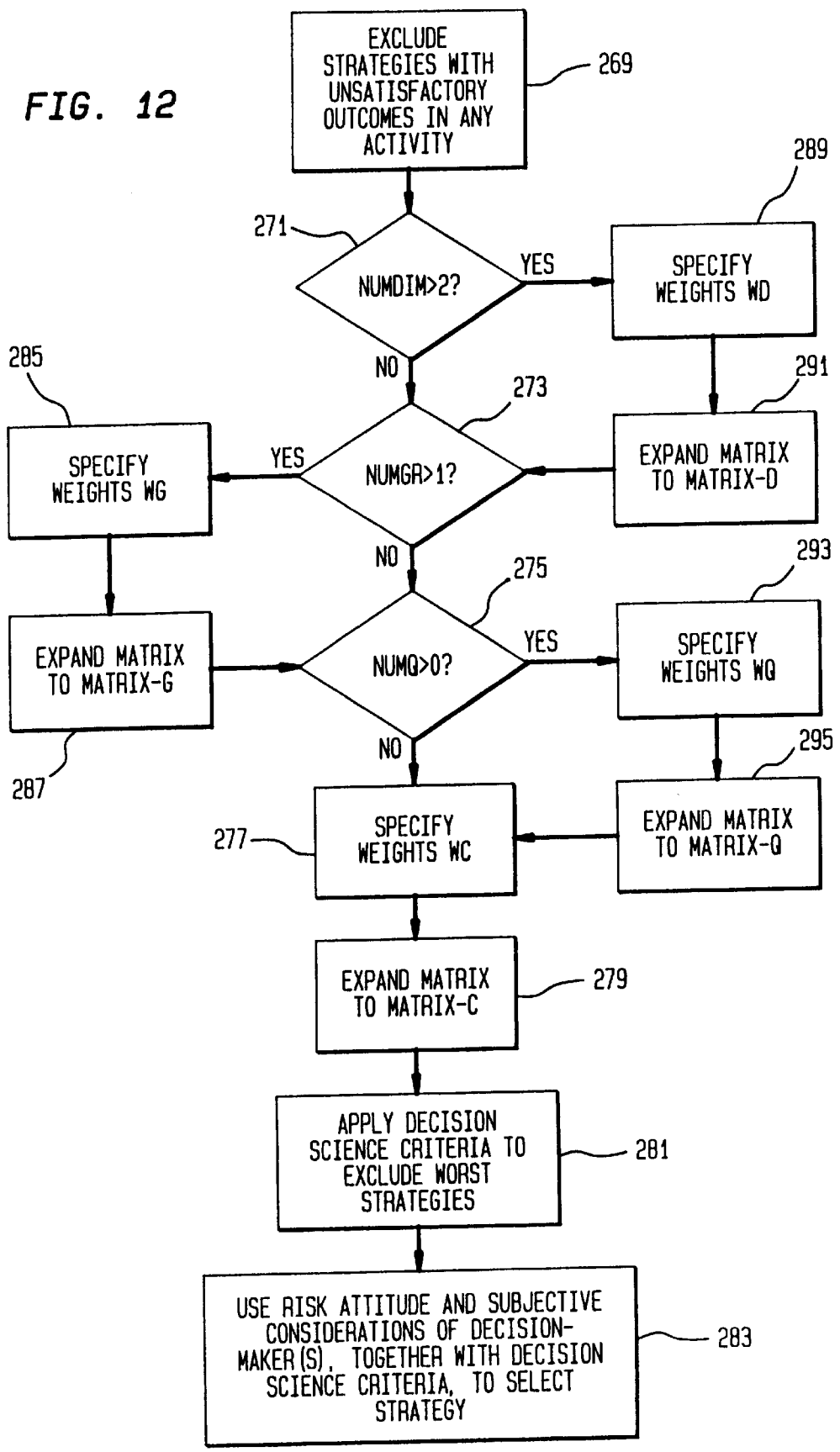
FIG. 12 is an extension of the flow charts of FIGS. 3, 4, and 6B illustrating selection of strategies.

The strategy selection method illustrated by the flow chart in FIG. 12 begins with step 269, where the purpose of the steps that follow is to process an outcome matrix and exclude strategies with unsatisfactory outcomes in any activity. From step 269, the method moves to decision point 271, where it is determined whether NUMDIM (the number of dimensions of the matrix) is greater than 2. If the answer is no, the method proceeds to decision point 273, where it is determined whether NUMGR (the number of members of the decision making group) is greater than 1. If the answer there is no, the method proceeds to step 275, where it is determined whether NUMQ (the number of types of qualitative characteristics that have to be transformed into quantitative values) is greater than zero.

If the answer at decision point 271 in FIG. 12 is yes, the method moves to step 289 to specify weights WD and to step 291 to expand the matrix to matrix-D. From step 291, the method moves to decision point 273. If the answer at decision point 273 in FIG. 12 is yes, the method moves to step 285, where weights WG are specified, and to step 287, where the matrix is expanded to matrix-G.

If the answer at decision point 275 in FIG. 12 is no, the method moves to step 277 to specify weights WC and to step 279 to expand the matrix to matrix-C. If the answer at decision point 275 is yes, the method moves to step 293 to specify weights WQ and to step 295 to expand the matrix to matrix-Q.

Finally in FIG. 12, the method moves from step 279 to step 281 and applies Decision Science criteria to exclude the worst strategies and to step 283 to use risk attitude and the subjective considerations of DMs, together with Decision Science criteria, to select the right strategy.

The method of processing the outcome matrix or the criteria for selecting a strategy by weighting can easily be followed on the flow chart of FIG. 12. After studying the payoff matrix and excluding those strategies that have unsatisfactory outcomes in any scenario or any activity, DMs:

determine NUMDIM, the number of dimensions of the matrix; NUMGR, the number of members of the decision-making group; and NUMQ, the number of types of qualitative characteristics that have to be transformed into quantitative values—steps 271, 273, and 275;

if NUMDIM>2, NUMGR>1, and NUMQ>0, develop a set of conversion weights for each of the respective transformations of the outcome matrix, as well as weights for different criteria for selection of a strategy—steps 285, 289, 293, and 277;

use the weights to expand the outcome matrix as desired (MATRIX-D is the initial matrix after its transformation into a two-dimensional matrix; MATRIX-G is the matrix after group member differences are taken into account, MATRIX-Q takes into account qualitative results; and MATRIX-C smooths over the differences between different DS criteria)—steps 291, 287, 295, and 279; and apply the criteria of Decision Science, as well as considerations of risk attitude and subjective preferences of DMs, to select a strategy on the basis of both the original outcome matrix and its expanded version—steps 281 and 283.

It is to be understood that the embodiments of the invention which have been described are illustrative. Numerous other arrangements and modifications may be readily devised by those skilled in the art without departing from the spirit and scope of the invention.

I claim:

1. A computer method for managing risk in multiple parameter physical systems performing interrelated activities, at least two of such activities being designated as risk-related activities and having outcome levels which may fall outside of boundary limits, said method developing a strategy for said physical systems preventing any outcome levels for said risk-related activities from falling outside of said boundary limits and comprising the steps of:

(1) storing an initial model of said systems in computer memory, said model including values for parameters of each of said physical systems;

(2) producing a solution of said initial model in said computer memory;

(3) deriving from said solution of said initial model a set of outcome levels for said risk-related activities and displaying said set of outcome levels in an at least three-dimensional matrix in the form of a graph;

(4) comparing said set of outcome levels for said risk-related activities with said boundary limits and, if any of said boundary limits are violated, then deriving at least one risk-limiting derivative constraint from such comparison;

(5) expanding said initial model in said computer memory by adding said risk-limiting derivative constraint to said initial model in said computer memory;

(6) producing a solution of said expanded model with said added risk-limiting derivative constraint in said computer memory; and (7) deriving from said solution of said expanded model a new set of outcome levels for said risk-related activities and displaying said new set of outcome levels in an at least three-dimensional matrix in the form of a graph.

2. The computer risk management method of claim 1 where each risk-limiting derivative constraint is in the form of mathematical equations and inequalities.

3. The computer risk management method of claim 1 where each risk-limiting derivative constraint is in the form of fines and penalties.

4. A computer method for managing risk in multiple parameter physical systems performing interrelated activities, at least two of such activities being designated as risk-related activities and having outcome levels which may fall outside of boundary limits, said method developing a strategy for said physical systems preventing any of said outcome levels for said risk-related activities from falling outside of said boundary limits and comprising the steps of:

(1) storing an initial model of said systems in said computer memory, said model including both a set of decision variables and values for parameters of each of said physical systems, where members of a subset of said decision variables are strategic variables and where a set of values specified for all said strategic variables constitutes a strategy;

(2) producing a solution of said initial model in said computer memory;

(3) deriving from said solution of said initial model a set of outcome levels for said risk-related activities and displaying said set of outcome levels in an at least three-dimensional matrix in the form of a graph;

(4) comparing said set of outcome levels for said risk-related activities with said boundary limits and, if the outcome level of at least one said risk-related activity falls outside said boundary limits for that activity, then deriving at least one risk-limiting derivative constraint from such comparison;

(5) expanding said initial model in said computer memory by adding said risk-limiting derivative constraint to said initial model in said computer memory;

(6) producing a solution of said expanded model with said added risk-limiting derivative constraint in said computer memory; and (7) deriving from said solution of said expanded model a new set of outcome levels for said risk-related activities and displaying said new set of outcome levels in an at least three-dimensional matrix in the form of a graph.

5. The computer risk management method of claim 4 in which said computational model of said physical systems is used to locate regions and groups of risky decisions and strategies and to cut off said regions and groups by adding to said model at least one derivative constraint.

6. A computer method for managing risk under certainty in multiple parameter physical systems performing interrelated activities, where certainty means that none of the parameters of said systems have a plurality of possible values, at least two of such activities being designated as risk-related activities and having outcome levels which may fall outside of boundary limits, said method developing a strategy for said physical systems preventing any of, said outcome levels for risk-related activities from falling outside of said boundary limits and comprising the steps of:

(1) storing an initial model of said systems in computer memory, said model including values for parameters of each of said physical systems;

(2) producing a solution of said initial model in said computer memory;

(3) deriving from said solution of said initial model a set of outcome levels for said risk-related activities and displaying said set of outcome levels in an at least three-dimensional matrix in the form of a graph;

(4) comparing said set of outcome levels for said risk-related activities with said boundary limits;

(5) if the outcome of at least one said risk-related activity falls outside said boundary limits for that activity, then forming a set of risk-limiting derivative constraints for all of said boundary limits;

(6) expanding said initial model in said computer memory by adding said set of risk-limiting derivative constraints to said initial model in said computer memory;

(7) producing a solution of said expanded model with said set of added risk-limiting derivative constraints in said computer memory;

(8) deriving from said solution of said expanded model a second set of outcome levels for said risk-related activities, and displaying said second set of outcome levels from expanded model in said matrix;

(9) comparing said second set of outcome levels for said risk-related activities with said boundary limits;

(10) changing said expanded model by changing some of said boundary limits and changing said risk-limiting derivative constraints for said changed boundary limits;

(11) producing a solution of said changed model with said changed risk-limiting derivative constraints in, said computer memory;

(12) deriving from said solution of said changed model a third set of outcome levels for said risk-related activities, and displaying said third set of outcome levels from said changed model in said matrix; and

(13) repeating steps (9) through (12) until no outcome level of any of said risk-related activities falls outside said boundary limits for that activity.

7. A computer method for managing risk in multiple parameter physical systems performing interrelated activities, at least two of such activities being designated as risk-related activities and having outcome levels which may fall outside of boundary limits, said method developing a strategy for said physical systems preventing any of said outcome levels for said risk-related activities from falling outside of said boundary limits and comprising the steps of:

(1) storing an initial model of said systems in said computer memory, said model including both a set of decision variables and values for parameters of each of said physical systems, where members of a subset of said decision variables are strategic variables; and where a set of values specified for all said strategic variables constitutes a strategy;

(2) producing a solution of said initial model in said computer memory;

(3) deriving from said solution of said initial model a set of outcome levels for said risk-related activities and displaying said set of outcome levels in an at least three-dimensional matrix in the form of a graph;

(4) comparing said set of outcome levels for said risk-related activities with said boundary limits and, if the outcome level of at least one said risk-related activity falls outside said boundary limits for that activity, then deriving at least one risk-limiting derivative constraint from such comparison;

(5) expanding said initial model in said computer memory by adding said risk-limiting derivative constraint to said initial model in said computer memory;

(6) producing a solution of said expanded models with said added risk-limiting derivative constraint in said computer memory;

(7) deriving from said solution of said expanded model a new set of outcome levels for said risk-related activities, and displaying said new Bet of outcome levels in said matrix;

(8) deriving from said solution of said expanded model a discretionary boundary limit for at least one sa d risk-related activity;

(9) comparing said new set of outcome levels with said set of discretionary boundary limits and deriving at least one additional discretionary risk-limiting constraint from such comparison;

(10) further expanding said expanded model in said computer memory by adding said discretionary risk-limiting constraint to said expanded model in said computer memory;

(11) producing a solution of said further expanded model with said discretionary risk-limiting constraint in said computer memory; and

(12) repeating steps (7) through (11) until outcome levels of all risk-related activities fall within boundary limits.

8. A computer method for managing risk under uncertainty in multiple parameter physical systems performing interrelated activities, where uncertainty means that at least one of said parameters has a plurality of different possible values, at least two of such activities being designated as risk-related activities and having outcome levels which may fall outside of boundary limits, said systems having parameters with certain values and at least one parameter with uncertain values, said method developing a strategy for said physical systems preventing any of said outcome levels for said risk-related activities from falling outside of said boundary limits and comprising the steps of:

(1) storing an initial model of said systems in computer memory, said model including both a set of decision variables and values for parameters of each of said physical systems, where members of a subset of said decision variables are strategic variables and where a set of values specified for said strategic variables constitutes a strategy;

(2) producing solutions of said initial model in said computer memory for a plurality of respectively different combinations of said parameter values, where each of said different combinations includes a respectively different one of said possible parameter values;

(3) deriving from said solutions of said initial model a set of outcome levels for said risk-related activities for each of said different combinations and displaying said set of outcome levels in an at least three-dimensional matrix in the form of a graph;

(4) comparing said set of outcome levels for said risk-related activities with said boundary limits and, if any of said boundary limits are violated, then deriving at least one risk-limiting derivative constraint from such comparison;

(5) expanding said model in said computer memory by adding said risk-limiting derivative constraint to said model in said computer memory;

(6) producing solutions of said expanded model with said added risk-limiting derivative constraint in said computer memory;

(7) repeating iteratively steps (2) through (6) until the outcome levels of all risk related activities fall within boundary limits;

(8) forming strategies for said physical systems from the values of said strategic variables in said solution of said expanded model and forming scenarios for different combinations of alternative values for said parameter with uncertain values; and (9) recording outcome levels for all scenario versus strategy versus risk-related activity combinations into said outcome matrix.

9. The computer risk management method of claim 8 which includes the additional step of:

(10) deriving from entries in said outcome matrix all scenario versus strategy versus risk-related activity combinations of regret values and forming a regret matrix in the form of a graph, where regret values, for each risk-related activity, are computed by the equation

REGRET[$H$][$J$]=BEST[$H$]−O[$H$][$J$], where BEST[H] is the best scenario outcome for scenario H and O[H][J] is the outcome for strategy J under scenario H.

10. The computer risk management method of claim 9 in which both of said matrices have n dimensions, where n is an integer greater than two.

11. A computer method for managing risk under uncertainty in multiple parameter physical systems performing interrelated activities, where uncertainty means that at least one of said parameters has a plurality of different possible values, at least two of such activities being designated as risk-related activities and having outcome levels which may fall outside of boundary limits, said method developing a strategy for said physical systems preventing any of said outcome levels for said risk-related activities from falling outside of said boundary limits and comprising the steps of:

(1) storing an initial model of said systems in, computer memory, said initial model including values for parameters of each of said physical systems, and said model comprising interconnected submodels for a plurality of respectively different combinations of said parameter values, where each of said different combinations is a respectively different scenario;

(2) entering values for each of said certain parameters into said scenario submodels in said computer memory;

(3) entering a respectively different one of said possible values for said uncertain parameter into each of said scenario submodels in said computer memory;

(4) producing a solution of said model in said computer memory, said solution including a subsolution for each of said scenario submodels;

(5) deriving from said subsolutions for each of said scenario submodels respective outcome levels for said risk-related activities for each said scenario and displaying said outcome levels in an at least three-dimensional matrix in the form of a graph;

(6) comparing said set of outcome levels for said risk-related activities from each of said scenario submodels with said boundary limits and, if any of said boundary limits are violated, then deriving at least one risk-limiting derivative constraint from such comparison;

(7) expanding at least some of said scenario submodels in said computer memory by adding said risk-limiting derivative constraint to such scenario submodels;

(8) producing solutions of said expanded submodels with said added risk-limiting derivative constraint in said computer memory; and (9) repeating iteratively steps (4) through (8) until the outcomes of all risk related activities fall within boundary limits.

* * * * *